United States Patent
Kishida et al.

(10) Patent No.: US 7,831,198 B2
(45) Date of Patent: Nov. 9, 2010

(54) BROADCAST RECEIVING APPARATUS

(75) Inventors: Tomotake Kishida, Kashihara (JP); Tsuyoshi Itaya, Takaishi (JP)

(73) Assignee: Sharp Kabushiki Kaisha, Osaka (JP)

( * ) Notice: Subject to any disclaimer, the term of this patent is extended or adjusted under 35 U.S.C. 154(b) by 596 days.

(21) Appl. No.: 11/889,592

(22) Filed: Aug. 15, 2007

(65) Prior Publication Data
US 2008/0060022 A1    Mar. 6, 2008

(30) Foreign Application Priority Data
Sep. 1, 2006    (JP) ............................ 2006-237968

(51) Int. Cl.
*H04H 20/74*    (2008.01)
(52) U.S. Cl. .................... 455/3.02; 455/349; 348/725
(58) Field of Classification Search ............... 455/3.02, 455/3.06, 347, 349, 300, 301; 348/725, 738
See application file for complete search history.

(56) References Cited
U.S. PATENT DOCUMENTS

| | | | |
|---|---|---|---|
| 5,710,999 A * | 1/1998 | Iwase et al. ................ | 455/349 |
| 6,785,509 B1 * | 8/2004 | Hatazawa .................. | 455/3.02 |
| 2003/0025841 A1 * | 2/2003 | Sawyer ..................... | 348/734 |
| 2003/0112381 A1 | 6/2003 | Yamamoto | |
| 2006/0050184 A1 * | 3/2006 | McMiller et al. .......... | 348/725 |

FOREIGN PATENT DOCUMENTS

| | | |
|---|---|---|
| JP | 9-214843 A | 8/1997 |
| JP | 2000-165761 A | 6/2000 |
| JP | 2002-9863 A | 1/2002 |
| JP | 3093322 U | 5/2003 |
| JP | 2003-309478 A | 10/2003 |
| JP | 2003-309776 A | 10/2003 |
| JP | 2006-197446 A | 7/2006 |

\* cited by examiner

*Primary Examiner*—Edward Urban
*Assistant Examiner*—Golam Sorowar
(74) *Attorney, Agent, or Firm*—Birch, Stewart, Kolasch & Birch, LLP

(57) ABSTRACT

A terrestrial broadcast tuner section is disposed in an area A1, and frequency-converts an externally supplied terrestrial broadcast signal into an IF signal. A terrestrial broadcast analog demodulation section is disposed in an area A3, and demodulates the IF signal frequency-converted by the terrestrial broadcast tuner section. A satellite broadcast tuner section is disposed in an area A2, and frequency-converts an externally supplied satellite broadcast signal into a signal having a frequency band lower than that of the satellite broadcast signal. A digital demodulation section is disposed in an area A4, and demodulates the signal supplied from either one of the terrestrial broadcast tuner section and the satellite broadcast tuner section. With this arrangement, a broadcast receiving apparatus easily changeable from the one for analog and digital broadcasting to the one for digital broadcasting only can be provided.

19 Claims, 13 Drawing Sheets

BROADCAST RECEIVING APPARATUS

This nonprovisional application is based on Japanese Patent Application No. 2006-237968 filed with the Japan Patent Office on Sep. 1, 2006, the entire contents of which are hereby incorporated by reference.

BACKGROUND OF THE INVENTION

1. Field of the Invention

The present invention relates to a broadcast receiving apparatus including a tuner unit.

2. Description of the Background Art

In Japan, analog TV broadcasting is planned to be replaced with digital TV broadcasting. Digital TV broadcasting provides terrestrial broadcasting and satellite broadcasting services. As an example of a tuner for receiving digital broadcasting, a digital satellite broadcast receiver is disclosed in Japanese Patent Laying-Open No. 09-214843.

Digital terrestrial broadcasting has been started in various cities in Japan, and both digital and analog TV broadcasting services are provided at present.

Accordingly, television receivers (hereinafter referred to as "TV sets") capable of receiving terrestrial (ground wave) digital broadcasting, terrestrial (ground wave) analog broadcasting, and satellite broadcasting have recently been increased.

When the tuner disclosed in Japanese Patent Laying-Open No. 09-214843, a tuner for receiving terrestrial digital broadcasting, and a tuner for receiving terrestrial analog broadcasting are combined to manufacture a TV set, however, such combined tuners result in complicated design and manufacturing processes and an increased manufacturing cost. For example, when a tuner for terrestrial broadcasting and a tuner for satellite broadcasting are placed on separate circuit boards, design and manufacturing processes such as for arranging cables connecting the circuit boards and for mounting the circuit boards within a TV set become complicated. Therefore, there is a demand for a compact tuner unit.

On the other hand, as the deadline for termination of analog TV broadcasting approaches, it is also expected that there will be a demand for a TV set capable of receiving and playing digital broadcasting only. Consequently, both a TV set for analog and digital broadcasting and a TV set for digital broadcasting only should be developed. In this case, attention should be paid on the problem described below.

FIG. 18 is an exemplary arrangement for a tuner unit for analog and digital broadcasting.

Firstly, when the arrangement as shown in FIG. 18 is employed to develop a tuner unit for analog and digital broadcasting, the developed tuner unit can also be used as a tuner unit for receiving digital broadcasting only when it is not provided with a component serving as an analog demodulation section. A TV set such as a television receiver equipped with the tuner unit can receive both analog broadcasting and digital broadcasting. On the other hand, since the analog demodulation section is arranged in the center of the tuner unit, the size of the entire tuner unit remains unchanged even if the analog demodulation section is not provided, and thus the cost of the tuner unit cannot be reduced so much.

Secondly, when the size of the tuner unit is reduced from the arrangement shown in FIG. 18 to develop a TV set for digital broadcasting only, the developed tuner unit for analog and digital broadcasting should be redesigned. The TV set should also be modified to match the redesigned layout of the tuner unit, and thus the TV set should also be redesigned. This results in poor design efficiency in the development of the tuner unit and the TV set as a total.

SUMMARY OF THE INVENTION

One object of the present invention is to provide a broadcast receiving apparatus easily changeable from the one for analog and digital broadcasting to the one for digital broadcasting only.

In summary, the present invention is a broadcast receiving apparatus, including a circuit board including a quadrangular mounting area having a first side, a second side connected to one end of the first side, a third side opposite to the first side, and a fourth side connected to the other end of the first side and opposite to the second side. The mounting area includes a first area having a rectangular shape in contact with a portion of the first side and a portion of the second side, a second area having a rectangular shape in contact with a portion of the first side and a portion of the fourth side, a third area having a rectangular shape in contact with the third side, a portion of the second side and the fourth side, and a fourth area in contact with the fourth side and disposed between the second area and the third area. The broadcast receiving apparatus further includes a terrestrial broadcast tuner section disposed in the first area for frequency-converting an externally supplied terrestrial broadcast signal into an IF signal, a terrestrial broadcast analog demodulation section disposed in the third area for demodulating the IF signal frequency-converted by the terrestrial broadcast tuner section, a satellite broadcast tuner section disposed in the second area for frequency-converting an externally supplied satellite broadcast signal into a signal having a frequency band lower than that of the satellite broadcast signal, and a digital demodulation section disposed in the fourth area for demodulating the signal supplied from either one of the terrestrial broadcast tuner section and the satellite broadcast tuner section.

Preferably, the broadcast receiving apparatus further includes a shield case accommodating the circuit board. A ground pattern of the circuit board is electrically connected with the shield case.

Preferably, the broadcast receiving apparatus further includes a shield case accommodating the circuit board, and a shield wall separating each of the first to fourth areas from others in a space inside the shield case. A ground pattern of the circuit board is electrically connected with the shield case.

Preferably, each of the terrestrial broadcast tuner section and the satellite broadcast tuner section includes a local oscillation circuit controlled by a phase-locked loop circuit. The broadcast receiving apparatus further includes a reference oscillation circuit supplying a common reference signal to the phase-locked loop circuit in each of the terrestrial broadcast tuner section and the satellite broadcast tuner section.

Preferably, the broadcast receiving apparatus further includes a terrestrial broadcast input terminal disposed on the circuit board to extend from the first side toward an outside of the mounting area, for receiving the externally supplied terrestrial broadcast signal, and a satellite broadcast input terminal disposed on the circuit board to extend from the first side toward the outside of the mounting area and disposed side by side with the terrestrial broadcast input terminal, for receiving the externally supplied satellite broadcast signal.

More preferably, the terrestrial broadcast tuner section includes a first filter for receiving the signal transmitted from the terrestrial broadcast input terminal. The broadcast receiving apparatus further includes an output terminal for splitting the signal output from the first filter and outputting the split signal to an outside of the broadcast receiving apparatus.

More preferably, the satellite broadcast tuner section includes a first filter for receiving the signal transmitted from the satellite broadcast input terminal. The broadcast receiving apparatus further includes an output terminal for splitting the signal output from the first filter and outputting the split signal to an outside of the broadcast receiving apparatus.

More preferably, the terrestrial broadcast tuner section includes a first filter for receiving the signal transmitted from the terrestrial broadcast input terminal. The satellite broadcast tuner section includes a second filter for receiving the signal transmitted from the satellite broadcast input terminal. The broadcast receiving apparatus further includes a first output terminal for splitting the signal output from the first filter and outputting the split signal to an outside of the broadcast receiving apparatus, and a second output terminal for splitting the signal output from the second filter and outputting the split signal to the outside of the broadcast receiving apparatus.

Preferably, the broadcast receiving apparatus further includes an input terminal for receiving the terrestrial broadcast signal and the satellite broadcast signal, a first filter provided on a path transmitting the signal from the input terminal to the terrestrial broadcast tuner section for selectively passing the terrestrial broadcast signal, and a second filter provided on a path transmitting the signal from the input terminal to the satellite broadcast tuner section for selectively passing the satellite broadcast signal.

More preferably, the broadcast receiving apparatus further includes an output terminal for branching and outputting the terrestrial broadcast signal selectively passed by the first filter.

Further preferably, the input terminal is disposed to be closest to one side of the first to fourth sides of the mounting area, and the output terminal is disposed to be closest to the one side in the same manner as the input terminal.

Further preferably, the input terminal is disposed to be closest to one side of the first to fourth sides of the mounting area, and the output terminal is disposed to be closest to a side different from the one side.

More preferably, the broadcast receiving apparatus further includes an output terminal for branching and outputting the satellite broadcast signal selectively passed by the second filter.

Further preferably, the input terminal is disposed to be closest to one side of the first to fourth sides of the mounting area, and the output terminal is disposed to be closest to the one side in the same manner as the input terminal.

Further preferably, the input terminal is disposed to be closest to one side of the first to fourth sides of the mounting area, and the output terminal is disposed to be closest to a side different from the one side.

More preferably, the broadcast receiving apparatus further includes a first output terminal for branching and outputting the terrestrial broadcast signal selectively passed by the first filter, and a second output terminal for branching and outputting the satellite broadcast signal selectively passed by the second filter.

Further preferably, the input terminal is disposed to be closest to one side of the first to fourth sides of the mounting area, and at least one of the first and second output terminals is disposed to be closest to the one side in the same manner as the input terminal.

Further preferably, the input terminal is disposed to be closest to one side of the first to fourth sides of the mounting area, and at least one of the first and second output terminals is disposed to be closest to a side different from the one side.

Preferably, any of the broadcast receiving apparatuses described above is capable of receiving analog terrestrial broadcasting, digital terrestrial broadcasting, and digital satellite broadcasting.

According to the present invention, the broadcast receiving apparatus is easily changeable from the one for analog and digital broadcasting to the one for digital broadcasting only, and thus advantageous in terms of manufacturing man-hour and cost.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
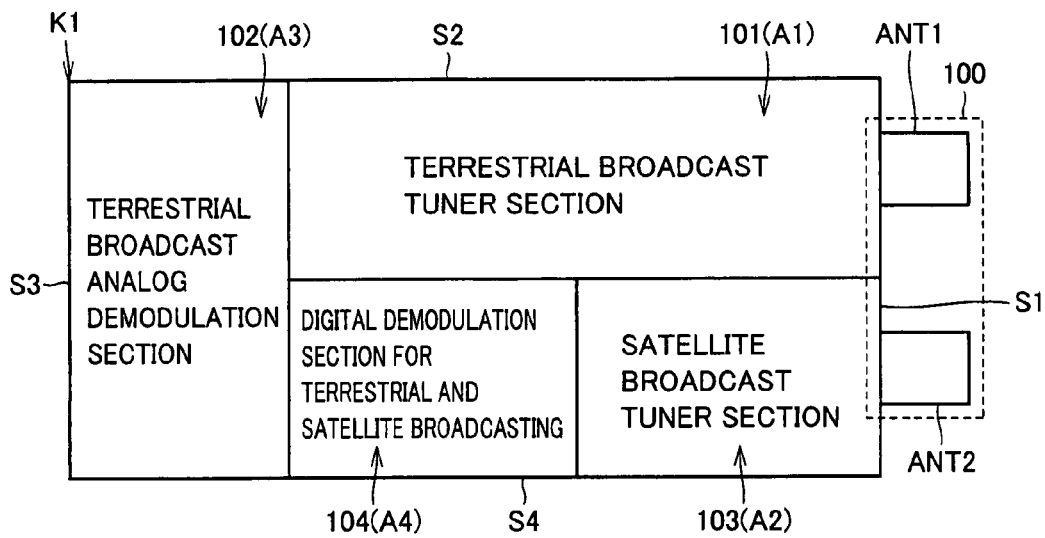
FIG. 1 is a schematic mounting diagram of a broadcast receiving apparatus in accordance with a first embodiment of the present invention.

Hereinafter, embodiments of the present invention will be described with reference to the drawings, in which identical or corresponding parts will be designated by the same reference characters, and description thereof will not be repeated.

First Embodiment

FIG. 1 is a schematic mounting diagram of a broadcast receiving apparatus in accordance with a first embodiment of the present invention.

Referring to FIG. 1, the broadcast receiving apparatus includes a terrestrial broadcast tuner section 101, a terrestrial broadcast analog demodulation section 102, a satellite broadcast tuner section 103, and a digital demodulation section 104.

The broadcast receiving apparatus has a circuit board K1 including a quadrangular mounting area having a side S1, a side. S2 connected to one end of side S1, a side S3 opposite to side S1, and a side S4 connected to the other end of side S1 and opposite to side S2.

The mounting area includes an area A1 having a rectangular shape in contact with a portion of side S1 and a portion of side S2, an area A2 having a rectangular shape in contact with a portion of side S1 and a portion of side S4, an area A3 having a rectangular shape in contact with side S3, a portion of side S2 and a portion of side S4, and an area A4 in contact with a portion of side S4 and disposed between area A2 and area A3.

Terrestrial broadcast tuner section 101 is disposed in area A1, and frequency-converts an externally supplied terrestrial broadcast signal into an IF (Intermediate Frequency) signal. Terrestrial broadcast analog demodulation section 102 is disposed in area A3, and demodulates the IF signal frequency-converted by terrestrial broadcast tuner section 101. Satellite broadcast tuner section 103 is disposed in area A2, and frequency-converts an externally supplied satellite broadcast signal into a signal having a frequency band lower than that of the satellite broadcast signal. Digital demodulation section 104 is disposed in area A4, and demodulates the signal supplied from either one of terrestrial broadcast tuner section 101 and satellite broadcast tuner section 103.

A receiving section 100 receives a terrestrial broadcast signal and a satellite broadcast signal. More specifically, receiving section 100 includes antennas (input terminals) ANT1-ANT2.

The terrestrial broadcast input terminal (ANT1) is disposed on circuit board K1 to extend from side S1 toward the outside of the mounting area, and receives an externally supplied terrestrial broadcast signal. The satellite broadcast input terminal (ANT2) is disposed on circuit board K1 to extend from side S1 toward the outside of the mounting area and disposed side by side with the terrestrial broadcast input terminal, and receives an externally supplied satellite broadcast signal.

More specifically, antenna ANT1 is a terminal for receiving an externally supplied terrestrial broadcast signal such as a UHF (Ultra High Frequency) signal having a frequency band of 470 MHz to 770 MHz for example, a VHF (Very High Frequency) high band signal having a frequency band lower than the UHF band, or a VHF low band signal having a frequency band lower than the VHF high band. Antenna ANT2 is a terminal for receiving an externally supplied satellite broadcast signal having a frequency band of 950 MHz to 2150 MHz for example. Antenna ANT1 is connected to terrestrial broadcast tuner section 101, and antenna ANT2 is connected to satellite broadcast tuner section 103.

Antennas ANT1-ANT2 are disposed on an identical end portion of circuit board K1, that is, on an identical side of a mounting surface of circuit board K1. This arrangement facilitates design of a product such as a TV set equipped with the broadcast receiving apparatus. For example, when the broadcast receiving apparatus is disposed adjacent to an end portion of a circuit board of a product, and the product is covered with a case having an opening at a position corresponding to antennas ANT1-ANT2 such that only antennas ANT1-ANT2 are exposed to the outside of the product, lines can be connected directly from the outside of the product to antennas ANT1-ANT2 of the broadcast receiving apparatus, and thus design of the product can be simplified.

Generally, the mounting area for satellite broadcast tuner section 103 is smaller than that for terrestrial broadcast tuner section 101. Accordingly, terrestrial broadcast tuner section 101 and satellite broadcast tuner section 103 are disposed in areas A1 and A2, respectively, and arranged vertically. Terrestrial broadcast analog demodulation section 102, which will not be needed when a tuner for digital broadcasting only is produced in the future, is disposed in area A3 in an end portion of circuit board K1 adjacent to side S3 opposite to side S1 on which antennas ANT1-ANT2 are disposed. Digital demodulation section 104 for terrestrial and satellite broadcasting is mounted in remaining area A4 between satellite broadcast tuner section 103 and terrestrial broadcast analog demodulation section 102 in the quadrangular mounting surface of circuit board K1. With this arrangement, the mounting surface of circuit board K1 can be minimized, and a smaller broadcast receiving apparatus can be obtained.

It is to be noted that, when antennas ANT1-ANT2 are disposed on an identical end portion on the left side of circuit board K1, areas A1-A4 are disposed with those shown in FIG. 1 reversed from left to right as a whole. Further, when antennas ANT1-ANT2 are disposed upside down, areas A1-A4 are disposed with those shown in FIG. 1 reversed upside down as a whole.

Terrestrial broadcast tuner section 101 frequency-converts a terrestrial broadcast signal input to antenna ANT1 into an IF signal.

When the input terrestrial broadcast signal is a terrestrial analog broadcast signal, terrestrial broadcast analog demodulation section 102 demodulates (detects) the IF signal frequency-converted by terrestrial broadcast tuner section 101, and outputs a demodulation signal (detection signal). More specifically, terrestrial broadcast analog demodulation section 102 demodulates the IF signal and outputs a video signal and at least one of an SIF (Sound Intermediate Frequency) signal and an audio signal.

Satellite broadcast tuner section 103 demodulates a satellite broadcast signal input to antenna ANT2 and outputs a demodulation signal.

Digital demodulation section 104 for terrestrial and satellite broadcasting demodulates the IF signal received from terrestrial broadcast tuner section 101 or an I/Q (In-phase and Quadrature) signal received from satellite broadcast tuner section 103, and outputs the demodulated signal to a TS (Transport Stream) decoder not shown.

Figure 2:
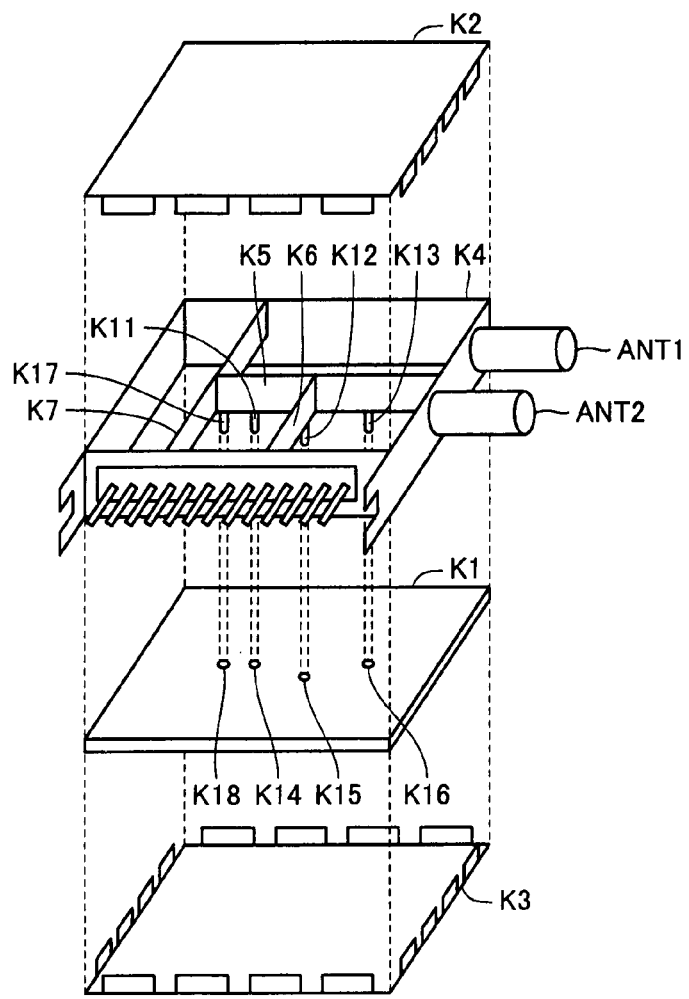
FIG. 2 is a perspective view illustrating a structure of the broadcast receiving apparatus in accordance with the first embodiment of the present invention.

FIG. 2 is a perspective view illustrating a structure of the broadcast receiving apparatus in accordance with the first embodiment of the present invention.

Referring to FIG. 2, in addition to the components shown in FIG. 1, the broadcast receiving apparatus further includes shield cases K2-K4, and shield walls K5-K7 separating each of areas A1-A4 from others in an internal space surrounded by shield cases K2-K4.

Shield cases K2-K3 serve as lids of the broadcast receiving apparatus in its finished state. Shield case K4 serves as a side wall of the broadcast receiving apparatus in its finished state. Shield cases K2-K4 accommodates circuit board K1. Shield walls K5-K7 are disposed inside shield case K4, and electrically connected to shield case K4.

Chassis legs K11-K13 and K17 formed on shield walls K5-K7 are inserted into chassis leg holes K14-K16 and K18 formed in circuit board K1, respectively, and electrically connected. Chassis leg holes K14-K16 and K18 are electrically connected with a GND (ground) pattern of circuit board K1. Accordingly, the GND pattern of circuit board K1 is electrically connected with shield cases K2-K4.

This arrangement can reduce an interference wave from the outside of the broadcast receiving apparatus, and prevent deterioration of reception characteristics of the broadcast receiving apparatus.

Further, with circuit board K1 accommodated in shield cases K2-K4, shield walls K5-K7 spatially separate terrestrial broadcast tuner section 101, terrestrial broadcast analog demodulation section 102, satellite broadcast tuner section 103, and digital demodulation section 104.

This arrangement can reduce mutual interference among terrestrial broadcast tuner section 101, terrestrial broadcast analog demodulation section 102, satellite broadcast tuner section 103, and digital demodulation section 104, and prevent deterioration of reception characteristics of the broadcast receiving apparatus.

Figure 3:
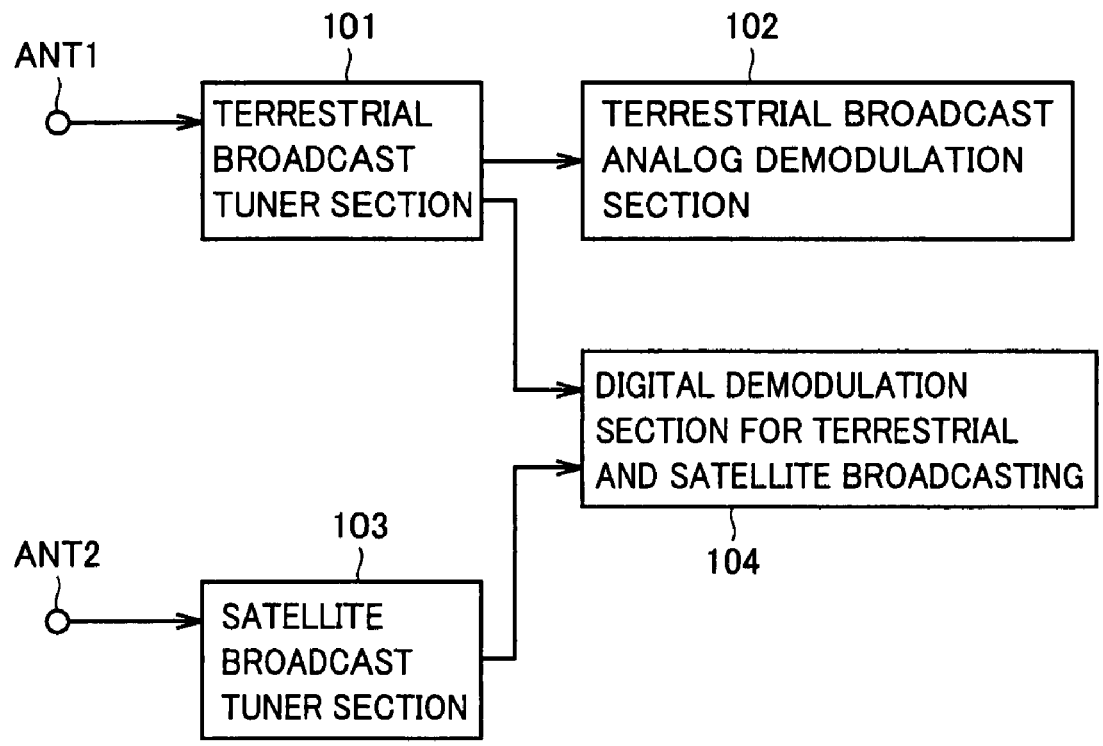
FIG. 3 is a functional block diagram illustrating a configuration of the broadcast receiving apparatus shown in FIG. 1.

FIG. 3 is a functional block diagram illustrating a configuration of the broadcast receiving apparatus shown in FIG. 1.

Referring to FIG. 3, a terrestrial broadcast signal is externally input to antenna ANT1, and a satellite broadcast signal is externally input to antenna ANT2. Antenna ANT1 is connected to terrestrial broadcast tuner section 101, and antenna ANT2 is connected to satellite broadcast tuner section 103.

Terrestrial broadcast tuner section 101 frequency-converts the terrestrial broadcast signal input to antenna ANT1 into an IF signal. Terrestrial broadcast analog demodulation section 102 demodulates (detects) the IF signal frequency-converted by terrestrial broadcast tuner section 101, and outputs a demodulation signal (detection signal).

Satellite broadcast tuner section 103 demodulates the satellite broadcast signal input to antenna ANT2 and outputs a demodulation signal.

Digital demodulation section 104 for terrestrial and satellite broadcasting demodulates the IF signal received from terrestrial broadcast tuner section 101 or the I/Q signal received from satellite broadcast tuner section 103, and outputs the demodulated signal to the TS decoder not shown.

Figure 4:
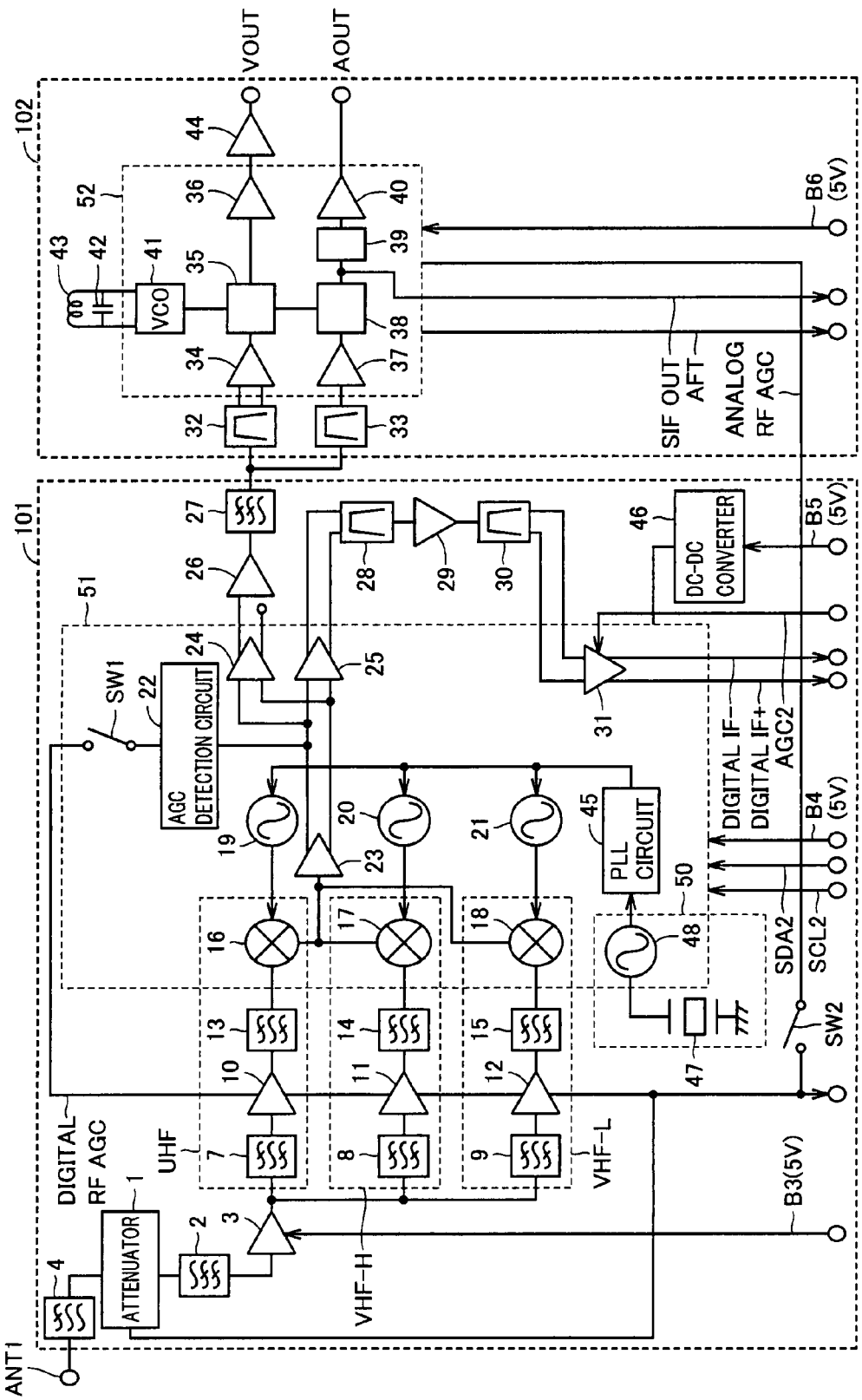
FIG. 4 is a functional block diagram illustrating configurations of a terrestrial broadcast tuner section 101 and a terrestrial broadcast analog demodulation section 102.

FIG. 4 is a functional block diagram illustrating configurations of terrestrial broadcast tuner section 101 and terrestrial broadcast analog demodulation section 102.

Referring to FIG. 4, terrestrial broadcast tuner section 101 includes a low-pass filter 4, an attenuator 1, a band-pass filter 2, an RF (Radio Frequency) amplifier 3, band-pass filters 7-9, RF amplifiers 10-12, band-pass filters 13-15, a mixer PLL (Phase-Locked Loop) section 51, an IF amplifier 26, a band-pass filter 27, an SAW (Surface Acoustic Wave) filter 28, an IF amplifier 29, an SAW filter 30, a DC (Direct Current)-DC converter 46, and a switch SW2. It is to be noted that terrestrial broadcast tuner section 101 may include a high-pass filter instead of band-pass filter 2, and may include a low-pass filter instead of band-pass filter 27.

Terrestrial broadcast analog demodulation section 102 includes SAW filters 32-33, a capacitor 42, a coil 43, an amplifier 44, and an analog demodulation section 52.

Mixer PLL section 51 is for example one IC (Integrated Circuit), and includes mixing circuits 16-18, local oscillation circuits 19-21, an AGC (Automatic Gain Control) detection circuit 22, a switch SW1, IF amplifiers 23-25, an IF amplifier 31, and a PLL circuit 45.

Analog demodulation section 52 is for example one IC, and includes a VIF (Video Intermediate Frequency) amplifier 34, a video demodulation circuit 35, an equalizer amplifier 36, an SIF amplifier 37, a sound detection circuit 38, an FM (Frequency Modulation) detection circuit 39, an AF (Audio Frequency) amplifier 40, and a VCO (Voltage Controlled Oscillator) 41.

Further, the broadcast receiving apparatus in accordance with the first embodiment of the present invention includes a reference oscillation circuit 50. Reference oscillation circuit 50 includes a crystal 47 and an oscillator 48. Reference oscillation circuit 50 oscillates and generates a reference signal having a frequency of, for example, 4 MHz.

[Terrestrial Broadcast Tuner Section 101]

A description will now be given of terrestrial broadcast tuner section 101.

Attenuator 1 attenuates a terrestrial broadcast signal input from antenna ANT1 via low-pass filter 4. Attenuator 1 changes the amount of attenuation based on an AGC control signal.

Band-pass filter 2 attenuates a component falling outside a predetermined band among frequency components of the terrestrial broadcast signal passed through attenuator 1.

RF amplifier 3 amplifies the terrestrial broadcast signal passed through band-pass filter 2.

Band-pass filters 7-9 attenuate a component falling outside a predetermined band among frequency components of the terrestrial broadcast signal amplified by RF amplifier 3. The terrestrial broadcast signal passed through band-pass filter 7 is an UHF signal, the terrestrial broadcast signal passed through band-pass filter 8 is a VHF high band signal, and the terrestrial broadcast signal passed through band-pass filter 9 is a VHF low band signal.

RF amplifiers 10-12 amplify the signals passed through band-pass filters 7-9, respectively. Further, RF amplifiers 10-12 change a gain based on the AGC control signal.

Band-pass filters 13-15 attenuate a component falling outside a predetermined band among frequency components of the terrestrial broadcast signals amplified by RF amplifiers 10-12, respectively.

Mixing circuits 16-18 multiply the terrestrial broadcast signals passed through band-pass filters 13-15 by local oscillation signals received from local oscillation circuits 19-21, respectively, to frequency-convert the terrestrial broadcast signals into IF signals. The IF signals have a frequency of, for example, 57 MHz.

IF amplifier 23 amplifies the IF signals received from mixing circuits 16-18. IF amplifiers 24-25 amplify the IF signal received from IF amplifier 23. IF amplifier 26 amplifies the IF signal received from IF amplifier 24.

Band-pass filter 27 attenuates a component falling outside a predetermined band among frequency components of the IF signal amplified by IF amplifier 26.

SAW filter 28 attenuates a component falling outside a predetermined band among frequency components of the IF signal received from IF amplifier 25. IF amplifier 29 amplifies the IF signal passed through SAW filter 28. SAW filter 30 attenuates a component falling outside a predetermined band among frequency components of the IF signal received from IF amplifier 29.

RF amplifier 31 amplifies the IF signal passed through SAW filter 30, and outputs the amplified IF signal to digital demodulation section 104 in FIG. 3. The IF signal output from RF amplifier 31 to the outside of the broadcast receiving apparatus is demodulated in digital demodulation section 104. Further, RF amplifier 31 changes a gain based on an AGC control signal AGC2 received from digital demodulation section 104 to keep the level of the IF signal supplied to digital demodulation section 104 constant.

AGC detection circuit 22 generates a digital RF AGC control signal based on the level of the IF signal received from IF amplifier 23.

PLL circuit 45 controls oscillation frequencies of local oscillation circuits 19-21 based on a PLL parameter transmitted by a control signal SCL2 and a control signal SDA2 received from the outside of the broadcast receiving apparatus, and the reference signal received from reference oscillation circuit 50.

For example, PLL circuit 45 compares a phase of a signal obtained by frequency-dividing each of the local oscillation signals from local oscillation circuits 19-21 by a predetermined frequency-dividing ratio with a phase of the reference signal from reference oscillation circuit 50. Based on the result of comparing the phases, PLL circuit 45 controls the oscillation frequencies of local oscillation circuits 19-21. Local oscillation circuits 19-21 oscillate based on the control by PLL circuit 45 and output the local oscillation signals.

DC-DC converter 46 converts an externally supplied DC voltage B5 of 5 volts into a DC voltage of 31 volts to supply it to mixer PLL section 51. Further, a DC voltage B4 of 5 volts is also externally supplied to mixer PLL section 51.

Switches SW1 and SW2 allow the digital RF AGC control signal generated by AGC detection circuit 22 or an analog RF AGC control signal which will be described later generated by terrestrial broadcast analog demodulation section 102 to be output to RF amplifiers 10-12, attenuator 1, and the outside of the broadcast receiving apparatus, according to the turning ON of one of the switches and the turning OFF of the other. The RF AGC control signal output to the outside of the broadcast receiving apparatus is generally used for a monitor.

[Terrestrial Broadcast Analog Demodulation Section 102]

A description will now be given of terrestrial broadcast analog demodulation section 102, also with reference to FIG. 4.

SAW filters 32-33 attenuate a component falling outside a predetermined band among frequency components of the IF signal passed through band-pass filter 27. The IF signal passed through SAW filter 32 is an IF signal in a sound signal band. The IF signal passed through SAW filter 33 is an IF signal in a video signal band.

VIF amplifier 34 amplifies the IF signal passed through SAW filter 32.

Video demodulation circuit 35 demodulates the IF signal received from VIF amplifier 34 based on an oscillation signal received from VCO 41, and outputs the demodulated IF signal as a video signal. The oscillation signal generated by VCO 41 has a frequency varying in accordance with a capacitance value of capacitor 42 and an inductance value of coil 43.

Equalizer amplifier 36 removes noise contained in the video signal received from video demodulation circuit 35, and adjusts amplitude characteristics of the video signal.

Amplifier 44 amplifies the video signal received from equalizer amplifier 36, and outputs a video signal VOUT to the outside of the broadcast receiving apparatus.

SIF amplifier 37 amplifies the IF signal passed through SAW filter 33.

Sound detection circuit 38 demodulates the IF signal received from SIF amplifier 37 based on the oscillation signal received from VCO 41, and outputs an SIF signal to FM detection circuit 39 and the outside of the broadcast receiving apparatus.

FM detection circuit 39 performs FM detection on the SIF signal received from sound detection circuit 38, and outputs the signal as an audio signal to AF amplifier 40.

AF amplifier 40 amplifies the audio signal received from FM detection circuit 39, and outputs an audio signal AOUT to the outside of the broadcast receiving apparatus.

At least one of video demodulation circuit 35, sound detection circuit 38, and FM detection circuit 39 generates the analog RF AGC control signal based on the level of the input IF signal.

Further, at least one of video demodulation circuit 35, sound detection circuit 38, and FM detection circuit 39 outputs to the outside of the broadcast receiving apparatus an AFT (Automatic Frequency Tuning) signal indicating a difference between a free-run frequency of VCO 41 and the frequency of the input IF signal. Generally, the AFT signal is used to implement a channel search function determining presence or absence of a broadcast station in a TV set or the like equipped with the broadcast receiving apparatus.

A DC voltage B6 of 5 volts is externally supplied to analog demodulation section 52.

[Satellite Broadcast Tuner Section 103]

Figure 5:
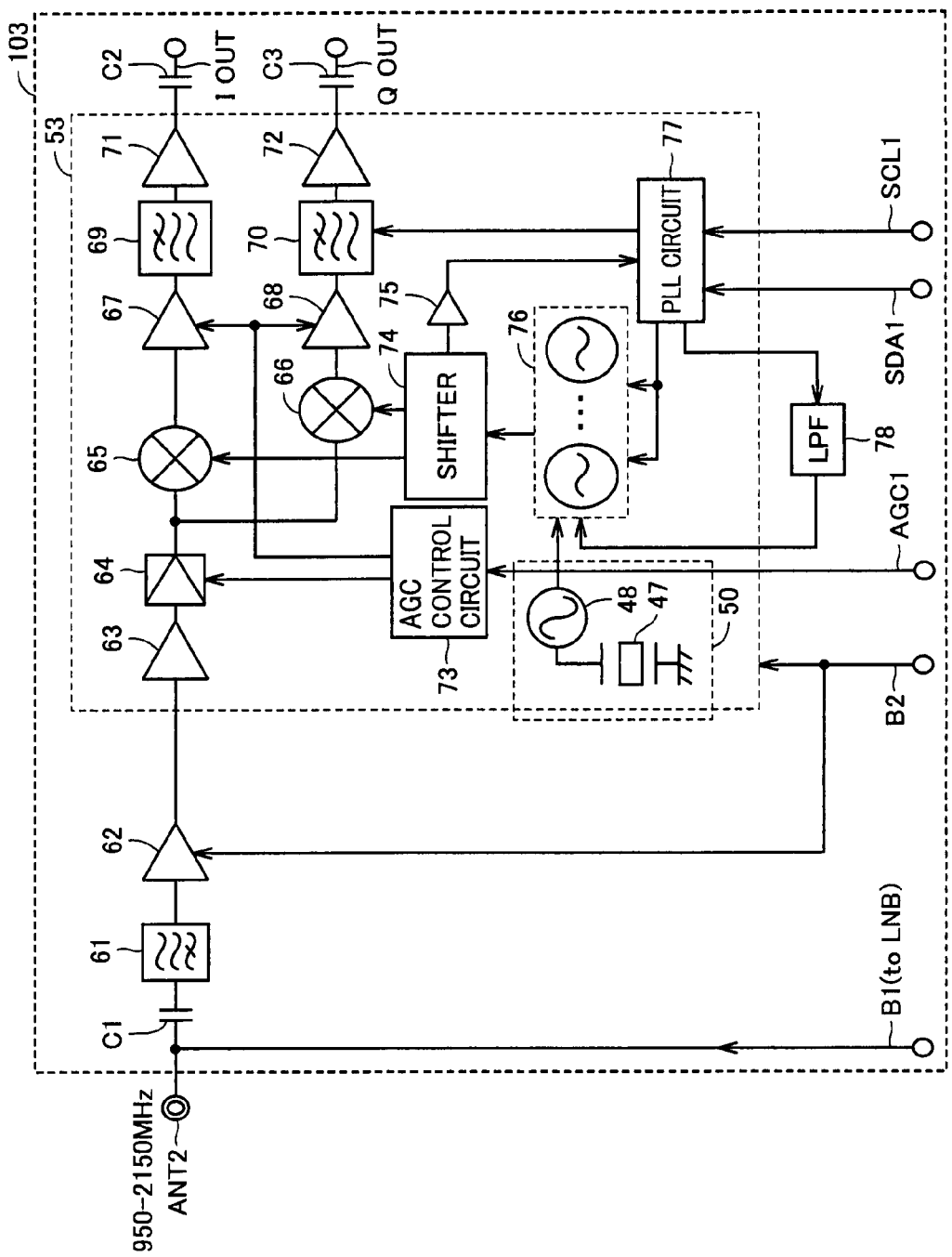
FIG. 5 is a functional block diagram illustrating a configuration of a satellite broadcast tuner section 103.

FIG. 5 is a functional block diagram illustrating a configuration of satellite broadcast tuner section 103.

Referring to FIG. 5, satellite broadcast tuner section 103 includes a high-pass filter 61, an RF amplifier 62, a mixer PLL section 53, a low-pass filter 78, and capacitors C1-C3.

Mixer PLL section 53 is for example one IC, and includes an RF amplifier 63, an AGC amplifier 64, mixing circuits 65-66, amplifiers 67-68, low-pass filters 69-70, amplifiers 71-72, an AGC control circuit 73, a shifter (phase-shift circuit) 74, an amplifier 75, a VCO 76, and a PLL circuit 77.

High-pass filter 61 attenuates a component having a frequency not more than a predetermined frequency among frequency components of the satellite broadcast signal input from antenna ANT2.

RF amplifier 62 amplifies the satellite broadcast signal passed through high-pass filter 61. RF amplifier 63 amplifies the satellite broadcast signal received from RF amplifier 62. AGC amplifier 64 amplifies the satellite broadcast signal received from RF amplifier 63. Further, AGC amplifier 64 changes a gain based on the control of AGC control circuit 73.

AGC control circuit 73 controls the gain of AGC amplifier 64 based on an AGC control signal AGC1 received from an IQ demodulation circuit (PSK (Phase Shift Keying) demodulation circuit) included in digital demodulation section 104 of FIG. 3.

Mixing circuits 65-66 multiply the satellite broadcast signal received from AGC amplifier 64 by a local oscillation signal received from shifter 74 to frequency-convert the satellite broadcast signal into an IF signal or a baseband signal, and output an I signal and a Q signal, respectively.

RF amplifiers 67-68 amplify the I signal and the Q signal received from mixing circuits 65 and 66, respectively.

Low-pass filters 69-70 attenuate a component having a frequency not more than a predetermined frequency among frequency components of the I signal and the Q signal received from RF amplifiers 67 and 68, respectively.

RF amplifiers 71-72 amplify the I signal and the Q signal passed through low-pass filters 69-70, respectively, and output the signals to the outside of the broadcast receiving apparatus. The I signal and the Q signal output from RF amplifiers 71-72, respectively, to the outside of the broadcast receiving apparatus are demodulated in digital demodulation section 104 of FIG. 3.

VCO 76 oscillates based on a control signal from PLL circuit 77 passed through low-pass filter 78 and the reference signal from reference oscillation circuit 50, and outputs a local oscillation signal.

Shifter 74 divides the local oscillation signal received from VCO 76 into two local oscillation signals having a phase difference of 90 degrees, and outputs the two signals to mixing circuits 65 and 66, respectively. Further, shifter 74 outputs to amplifier 75 at least one of the local oscillation signals to be output to mixing circuits 65 and 66. Amplifier 75 amplifies the local oscillation signal received from shifter 74, and outputs the amplified local oscillation signal to PLL circuit 77.

PLL circuit 77 generates a control signal based on a PLL parameter transmitted by a control signal SCL1 and a control signal SDA1 received from the outside of the broadcast receiving apparatus, and the local oscillation signal received from amplifier 75, and outputs the control signal to low-pass filter 78.

Low-pass filter 78 attenuates a component having a frequency not less than a predetermined frequency among frequency components of the control signal received from PLL circuit 77.

Capacitors C1-C3 are disposed to prevent an effect caused by a DC voltage across a front stage circuit and a rear stage circuit.

A DC voltage B2 is supplied from the outside of the broadcast receiving apparatus to RF amplifier 62 and mixer PLL section 53. A DC voltage B1 supplied from the outside of the broadcast receiving apparatus is supplied to an LNB (Low Noise Block down converter) on the side of antenna ANT2, via the broadcast receiving apparatus.

Figure 6:
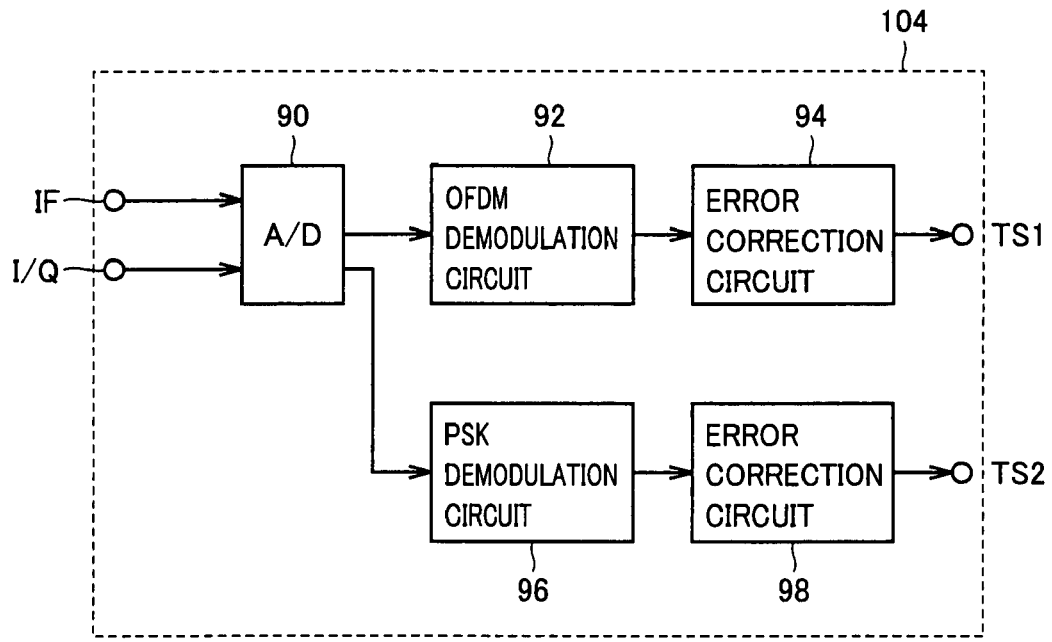
FIG. 6 is a functional block diagram illustrating a configuration of a digital demodulation section 104 in FIG. 3.

FIG. 6 is a functional block diagram illustrating a configuration of digital demodulation section 104 in FIG. 3.

Referring to FIG. 6, digital demodulation section 104 includes an A/D (Analog-to-Digital) converter 90, an OFDM (Orthogonal Frequency Division Multiplexing) demodulation circuit 92, an error correction circuit 94 correcting an error in an output of OFDM demodulation circuit 92, a PSK demodulation circuit 96, and an error correction circuit 98 correction an error in an output of PSK demodulation circuit 96.

For example, a compound digital demodulation IC can be used as digital demodulation section 104. Emergence of such a compound digital demodulation IC in which a digital demodulation section performing OFDM demodulation and a digital demodulation section performing PSK demodulation are integrated on one chip has facilitated the development of a compound terrestrial/satellite digital tuner in which a terrestrial digital tuner section and a satellite digital tuner section are accommodated in one case.

A/D converter 90 converts the IF signal received from terrestrial broadcast tuner section 101 or the I signal and the Q signal received in satellite broadcast tuner section 103 into a digital signal(s).

OFDM demodulation circuit 92 performs OFDM demodulation and QAM (Quadrature Amplitude Modulation) demodulation on the IF signal converted into a digital signal. The output of OFDM demodulation circuit 92 is subjected to error correction by error correction circuit 94, and converted into a TS signal.

PSK demodulation circuit 96 performs QPSK (Quadrature Phase Shift Keying) demodulation or 8PSK demodulation on the I signal and the Q signal converted into a digital signals. The output of PSK demodulation circuit 96 is subjected to error correction by error correction circuit 98, and converted into a TS signal.

A backend section not shown decodes the TS signals and outputs a video signal, a sound signal and data.

As described above, when a tuner for receiving satellite digital broadcasting, a tuner for receiving terrestrial digital broadcasting, and a tuner for receiving terrestrial analog broadcasting are combined to manufacture a TV set, such combined tuners result in complicated design and manufacturing processes and an increased manufacturing cost.

In the broadcast receiving apparatus in accordance with the first embodiment of the present invention, however, terrestrial broadcast tuner section 101, terrestrial broadcast analog demodulation section 102, satellite broadcast tuner section 103, and digital demodulation section 104 are disposed on one circuit board. Therefore, design and manufacturing processes for a TV set or the like including terrestrial broadcast tuner section 101, terrestrial broadcast analog demodulation section 102, satellite broadcast tuner section 103, and digital demodulation section 104 can be simplified, and manufacturing cost can be reduced.

Further, once the broadcast receiving apparatus in accordance with the first embodiment of the present invention has been designed, a TV set without the function of receiving analog terrestrial broadcasting can be manufactured just by not mounting terrestrial broadcast analog demodulation section 102 on circuit board K1. Accordingly, the manufacturing process can be simplified.

Furthermore, in the case where terrestrial broadcast tuner section 101, terrestrial broadcast analog demodulation section 102, satellite broadcast tuner section 103, and digital demodulation section 104 are all mounted on circuit board K1 and in the case where some of them are mounted on circuit board K1, broadcast receiving apparatuses in the above cases can have a common shape. Accordingly, a common design can be employed for an expensive TV set and an inexpensive TV set, and thus the efficiency of the design and manufacturing processes can significantly be improved.

Further, since analog demodulation section 102 is disposed in an end portion of the circuit board, the circuit board can be downsized with a required pin arrangement unchanged when a tuner for digital broadcasting only is implemented. Future cost reduction can also be achieved easily, and a substantial change in a TV set is not required.

Other embodiments of the present invention will now be described with reference to the drawings. In the description below, parts identical or corresponding to those in the first embodiment will be designated by the same reference characters, and description thereof will not be repeated.

Second Embodiment

Figure 7:
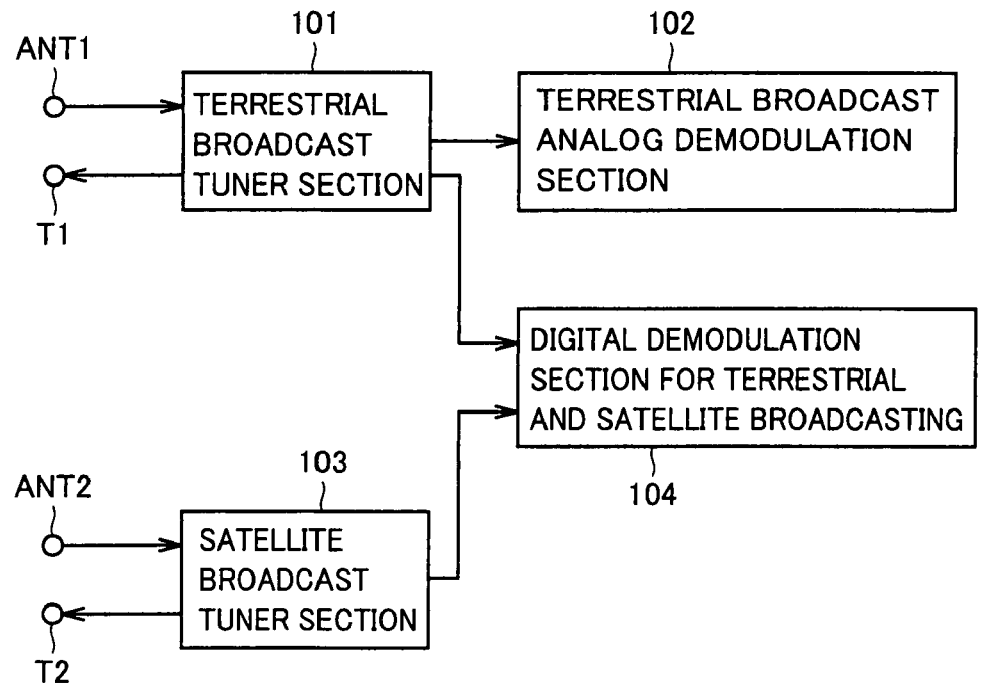
FIG. 7 is a functional block diagram illustrating a configuration of a broadcast receiving apparatus in accordance with a second embodiment.

FIG. 7 is a functional block diagram illustrating a configuration of a broadcast receiving apparatus in accordance with a second embodiment.

Referring to FIG. 7, the broadcast receiving apparatus in accordance with the second embodiment includes terminals T1 and T2 for splitting the broadcast signals to other apparatuses, in addition to the components of the broadcast receiving apparatus in accordance with the first embodiment shown in FIG. 3. Since other components have been described in FIG. 3, description thereof will not be repeated.

Figure 8:
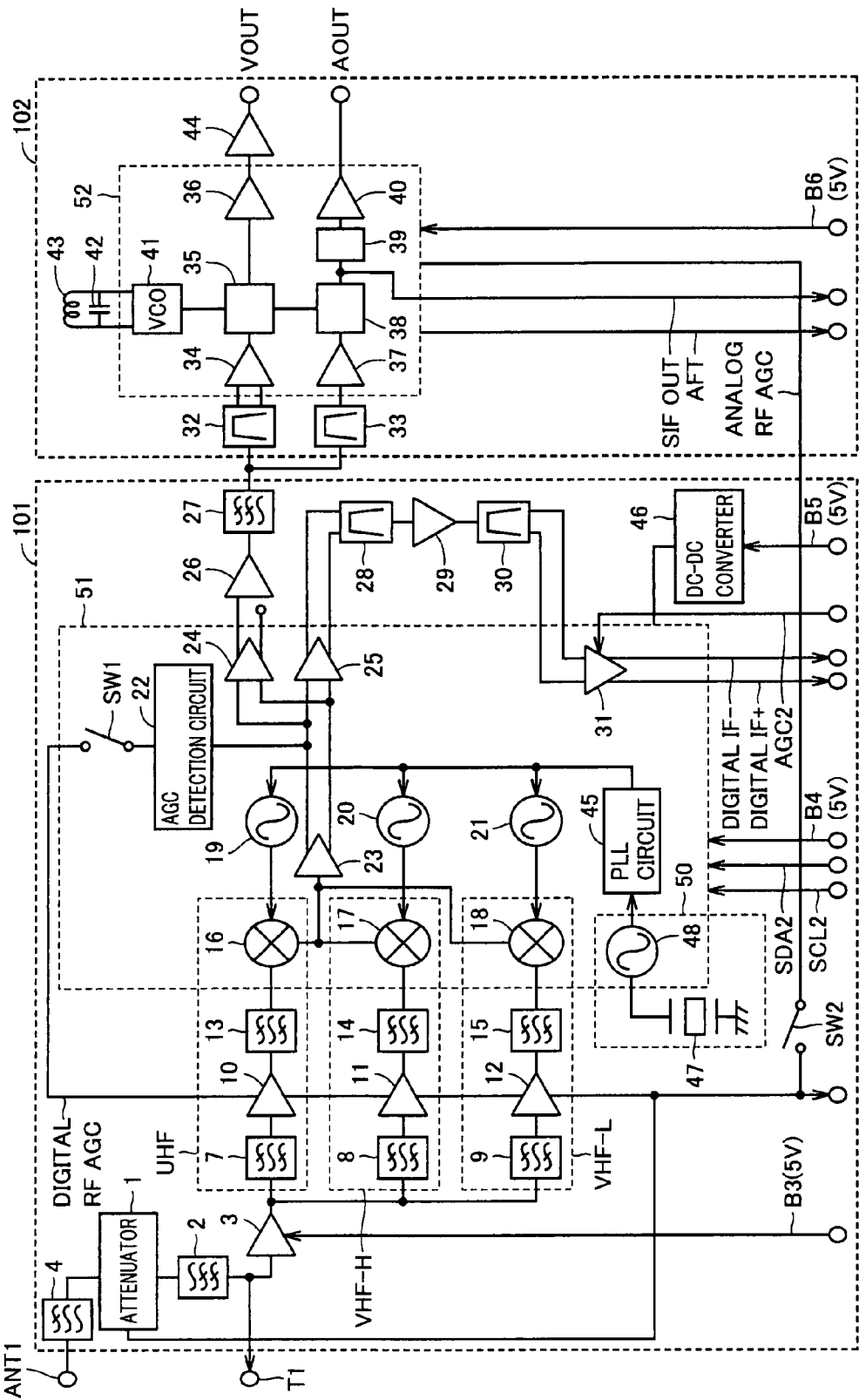
FIG. 8 is a circuit diagram illustrating a position where a terminal T1 of FIG. 7 is connected.

FIG. 8 is a circuit diagram illustrating a position where terminal T1 of FIG. 7 is connected.

Referring to FIG. 8, the signal output from band-pass filter 2 to RF amplifier 3 is split to terminal T1.

Specifically, terrestrial broadcast tuner section 101 includes a filter (2) for receiving the signal transmitted from the terrestrial broadcast input terminal (ANT1). The broadcast receiving apparatus further includes an output terminal (T1) for splitting the signal output from the filter (2) and outputting the split signal to the outside of the broadcast receiving apparatus.

Since other components in FIG. 8 have been described in FIG. 4, description thereof will not be repeated.

Figure 9:
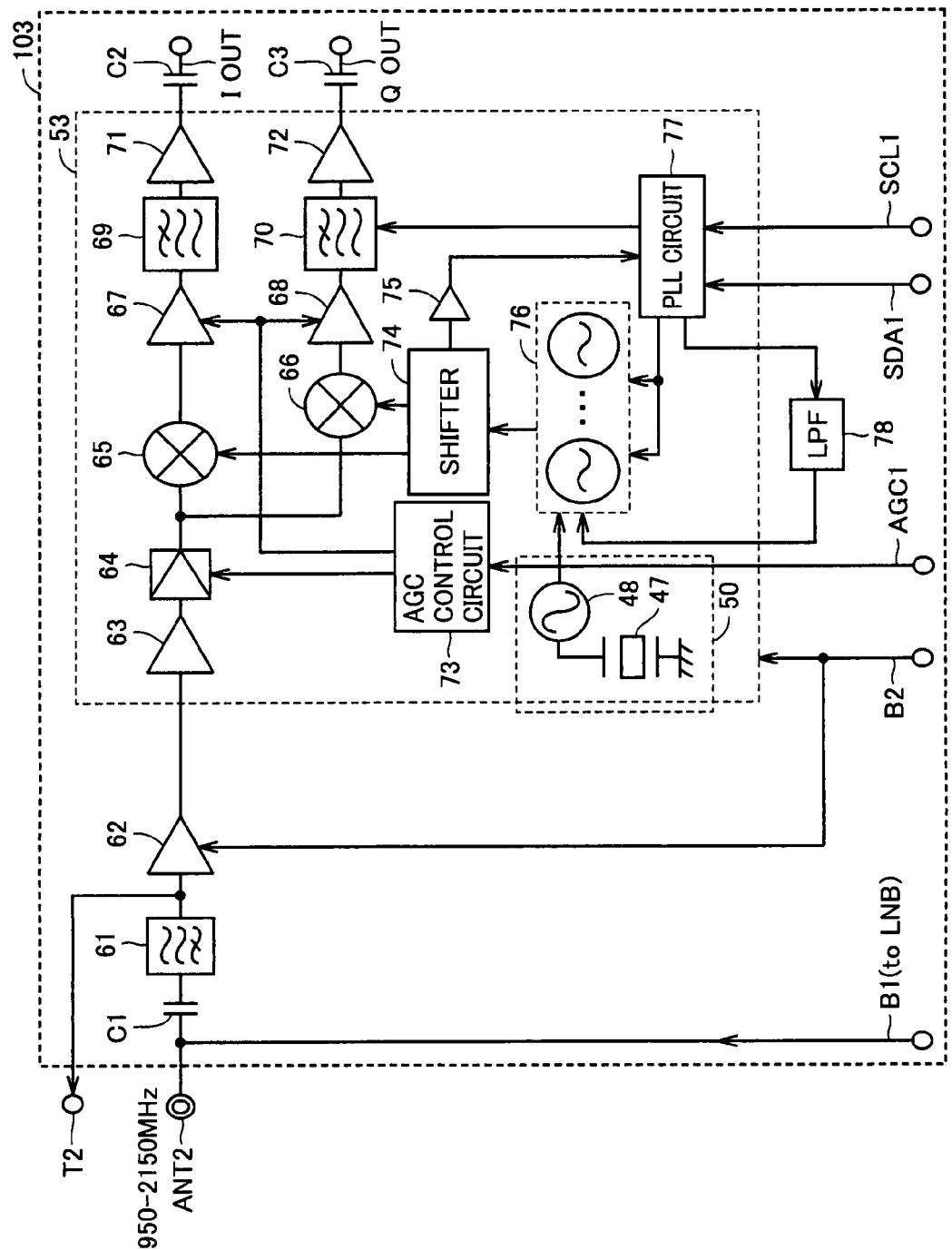
FIG. 9 is a circuit diagram illustrating a position where a terminal T2 of FIG. 7 is connected.

FIG. 9 is a circuit diagram illustrating a position where terminal T2 of FIG. 7 is connected.

Referring to FIG. 9, the signal output from high-pass filter 61 to RF amplifier 62 is split to terminal T2.

Specifically, satellite broadcast tuner section 103 includes a filter (61) for receiving the signal transmitted from the satellite broadcast input terminal (ANT2). The broadcast receiving apparatus includes an output terminal (T2) for splitting the signal output from the filter (61) and outputting the split signal to the outside of the broadcast receiving apparatus.

Since other components in FIG. 9 have been described in FIG. 5, description thereof will not be repeated.

Figure 10:
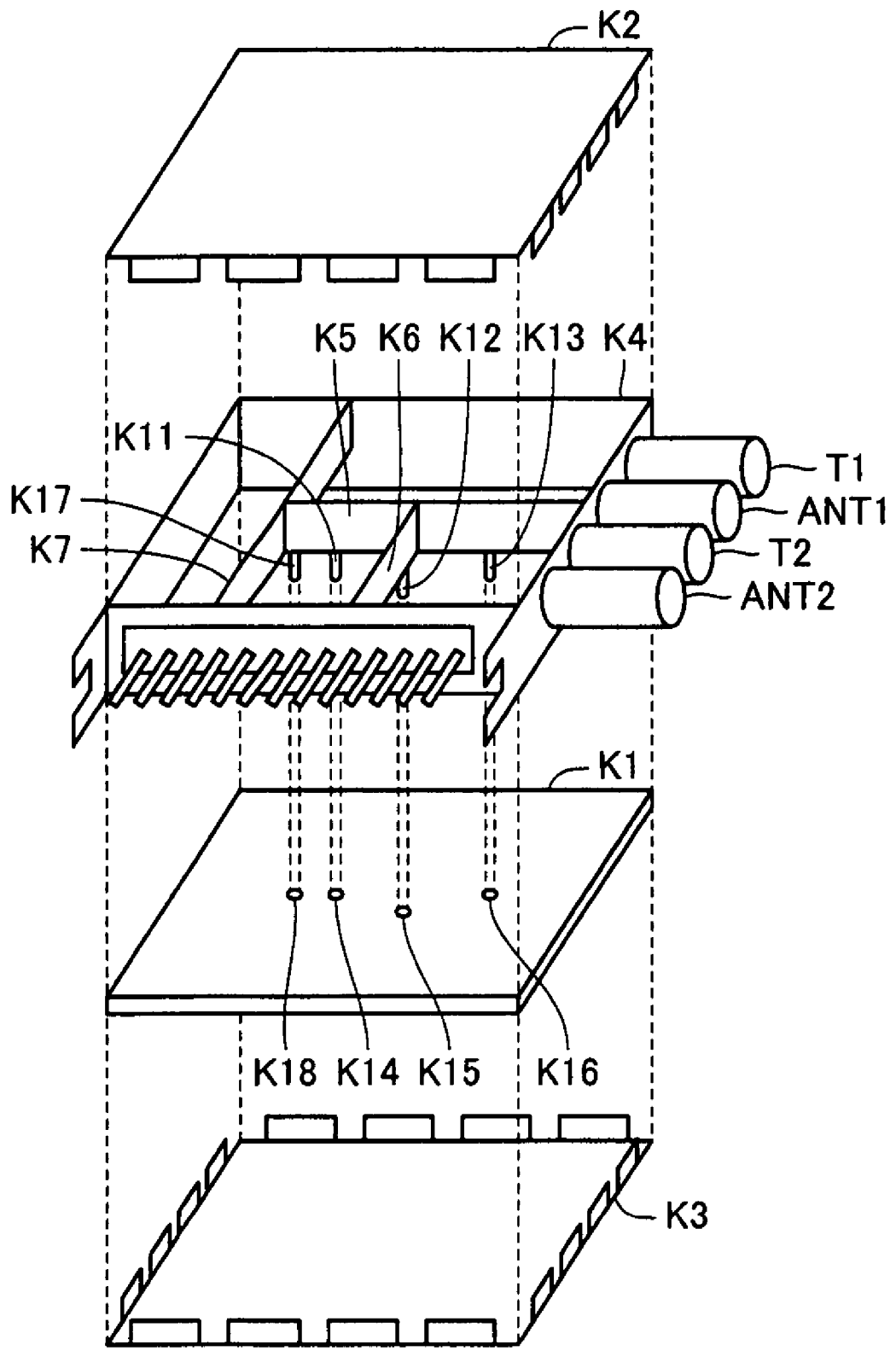
FIG. 10 is a perspective view showing how terminals T1 and T2 are attached to a shield case.

FIG. 10 shows how terminals T1 and T2 are attached to the shield case.

Referring to FIG. 10, antennas ANT1 and ANT2 and terminals T1 and T2 are disposed on an identical end portion of circuit board K1, that is, on an identical side of the mounting surface of circuit board K1.

Specifically, terrestrial broadcast tuner section 101 includes a first filter (2) for receiving the signal transmitted from the terrestrial broadcast input terminal as shown in FIG. 8, and satellite broadcast tuner section 103 includes a second filter (61) for receiving the signal transmitted from the satellite broadcast input terminal as shown in FIG. 9. The broadcast receiving apparatus includes a first output terminal (T1) for splitting the signal output from the first filter (2) and outputting the split signal to the outside of the broadcast receiving apparatus, and a second output terminal (T2) for splitting the signal output from the second filter (61) and outputting the split signal to the outside of the broadcast receiving apparatus.

This arrangement facilitates design of a product such as a TV set equipped with the broadcast receiving apparatus. For example, when the broadcast receiving apparatus is disposed adjacent to an end portion of a circuit board of a product, and the product is covered with a case having an opening at a position corresponding to antennas ANT1-ANT2 and splitting output terminals T1-T2 such that only antennas ANT1-ANT2 and splitting output terminals T1-T2 are exposed to the outside of the product, lines can be connected directly from the outside of the product to antennas ANT1-ANT2 and splitting output terminals T1-T2 of the broadcast receiving apparatus, and thus design of the product can be simplified.

Third Embodiment

A third embodiment relates to a broadcast receiving apparatus having a common antenna for terrestrial broadcasting and satellite broadcasting. Components and operations other than those described below are the same as those for the broadcast receiving apparatus in accordance with the first embodiment.

Figure 11:
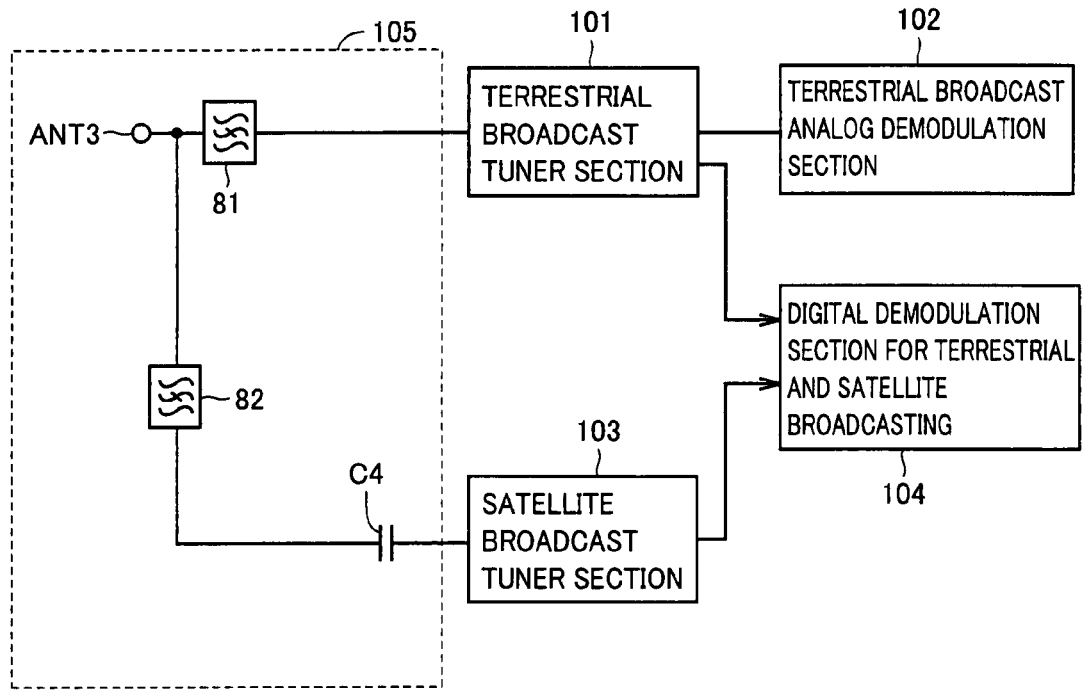
FIG. 11 is a functional block diagram illustrating a configuration of a broadcast receiving apparatus in accordance with a third embodiment of the present invention.

FIG. 11 is a functional block diagram illustrating a configuration of a broadcast receiving apparatus in accordance with a third embodiment of the present invention.

Referring to FIG. 11, the broadcast receiving apparatus includes a receiving section 105 instead of receiving section 100 in accordance with the first embodiment. Receiving section 105 includes an antenna ANT3, a low-pass filter 81, a high-pass filter 82, and a capacitor C4.

Antenna ANT3 receives an externally supplied radio signal containing a terrestrial broadcast signal and a satellite broadcast signal.

Low-pass filter 81 attenuates a component having a frequency not less than a predetermined frequency among frequency components of the radio signal input from antenna ANT3 to extract the terrestrial broadcast signal, and outputs the terrestrial broadcast signal to terrestrial broadcast tuner section 101.

High-pass filter 82 attenuates a component having a frequency not more than a predetermined frequency among frequency components of the radio signal input from antenna ANT3 to extract the satellite broadcast signal, and outputs the satellite broadcast signal to satellite broadcast tuner section 103.

On this occasion, the signal component attenuated by low-pass filter 81 preferably has a minimum frequency that neither allows an UHF signal in the highest frequency band of the terrestrial broadcast signal to be attenuated nor allows the satellite broadcast signal to be passed.

Further, the signal component attenuated by high-pass filter 82 preferably has a maximum frequency that neither allows the satellite broadcast signal to be attenuated nor allows the terrestrial broadcast signal to be passed.

Accordingly, the magnitude relation between the minimum frequency of the signal component attenuated by low-pass filter 81 and the maximum frequency of the signal component attenuated by high-pass filter 82 is not particularly limited, and either one may be larger than the other, or they may be equal.

Capacitor C4 is disposed to prevent an effect caused by a DC voltage across a front stage circuit and a rear stage circuit.

Specifically, the broadcast receiving apparatus shown in FIG. 11 includes an input terminal (ANT3) for receiving the terrestrial broadcast signal and the satellite broadcast signal, a first filter (81) provided on a path transmitting the signal from the input terminal to terrestrial broadcast tuner section 101 for selectively passing the terrestrial broadcast signal, and a second filter (82) provided on a path transmitting the signal from the input terminal to satellite broadcast tuner section 103 for selectively passing the satellite broadcast signal.

Accordingly, in the broadcast receiving apparatus in accordance with the third embodiment of the present invention, a common antenna is used for receiving the terrestrial broadcast signal and the satellite broadcast signal. Consequently, compared to the broadcast receiving apparatus in accordance with the first embodiment, the broadcast receiving apparatus as well as a TV set or the like equipped with the broadcast receiving apparatus can further be downsized, and manufacturing cost can further be reduced.

Fourth Embodiment

A fourth embodiment relates to a broadcast receiving apparatus having a common antenna for terrestrial broadcasting and satellite broadcasting. Components and operations other than those described below are the same as those for the broadcast receiving apparatus in accordance with the third embodiment.

Figure 12:
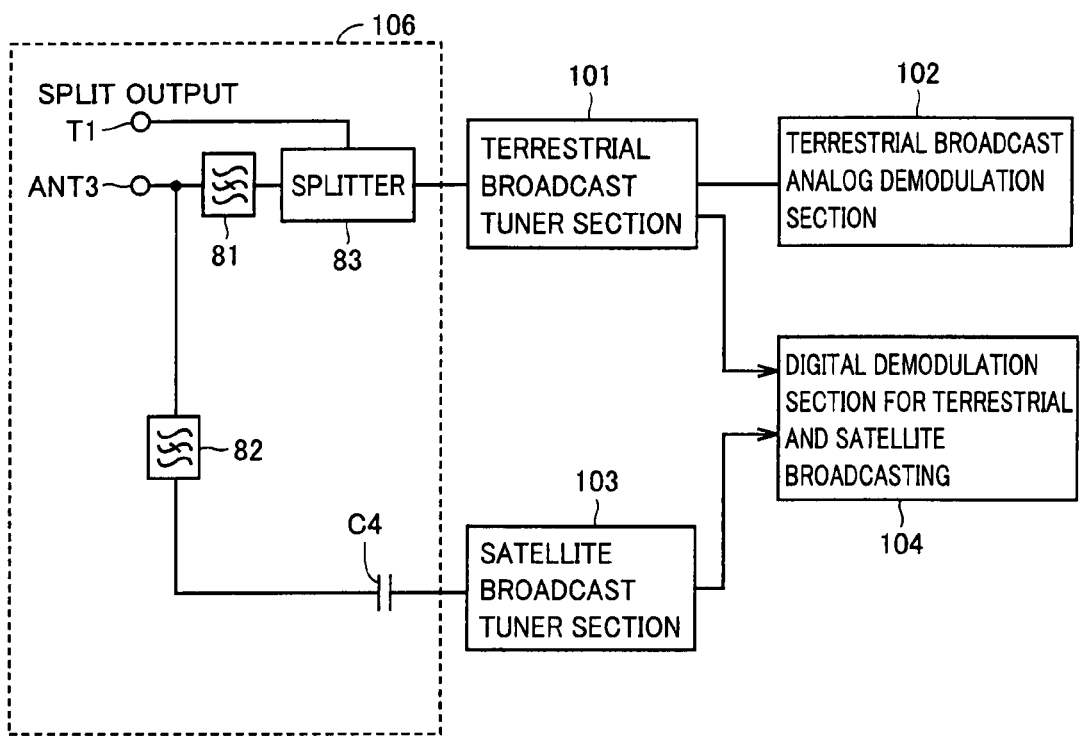
FIG. 12 is a functional block diagram illustrating a configuration of a broadcast receiving apparatus in accordance with a fourth embodiment of the present invention.

FIG. 12 is a functional block diagram illustrating a configuration of a broadcast receiving apparatus in accordance with a fourth embodiment of the present invention.

Referring to FIG. 12, the broadcast receiving apparatus includes a receiving section 106 instead of receiving section 105 in accordance with the third embodiment. Receiving section 106 includes antenna ANT3, low-pass filter 81, high-pass filter 82, capacitor C4, a splitter 83, and splitting output terminal T1.

Splitter 83 splits the attenuated terrestrial broadcast signal passed through low-pass filter 81, and outputs the split attenuated terrestrial broadcast signals to terrestrial broadcast tuner section 101 and to the outside of the broadcast receiving apparatus via splitting output terminal T1.

Specifically, the broadcast receiving apparatus arranged as shown in FIG. 12 includes an input terminal (ANT3) for receiving the terrestrial broadcast signal and the satellite broadcast signal, a first filter (81) provided on a path transmitting the signal from the input terminal to terrestrial broadcast tuner section 101 for selectively passing the terrestrial broadcast signal, a second filter (82) provided on a path transmitting the signal from the input terminal to satellite broadcast tuner section 103 for selectively passing the satellite broadcast signal, and an output terminal (T1) for branching and outputting the terrestrial broadcast signal selectively passed by the first filter.

With this arrangement, connection can be established for example between an input terminal of an apparatus different from the apparatus such as a TV set equipped with the broadcast receiving apparatus and output terminal T1 of splitter 83 of the broadcast receiving apparatus, and the terrestrial broadcast signal can easily be received by a plurality of apparatuses.

Figure 13:
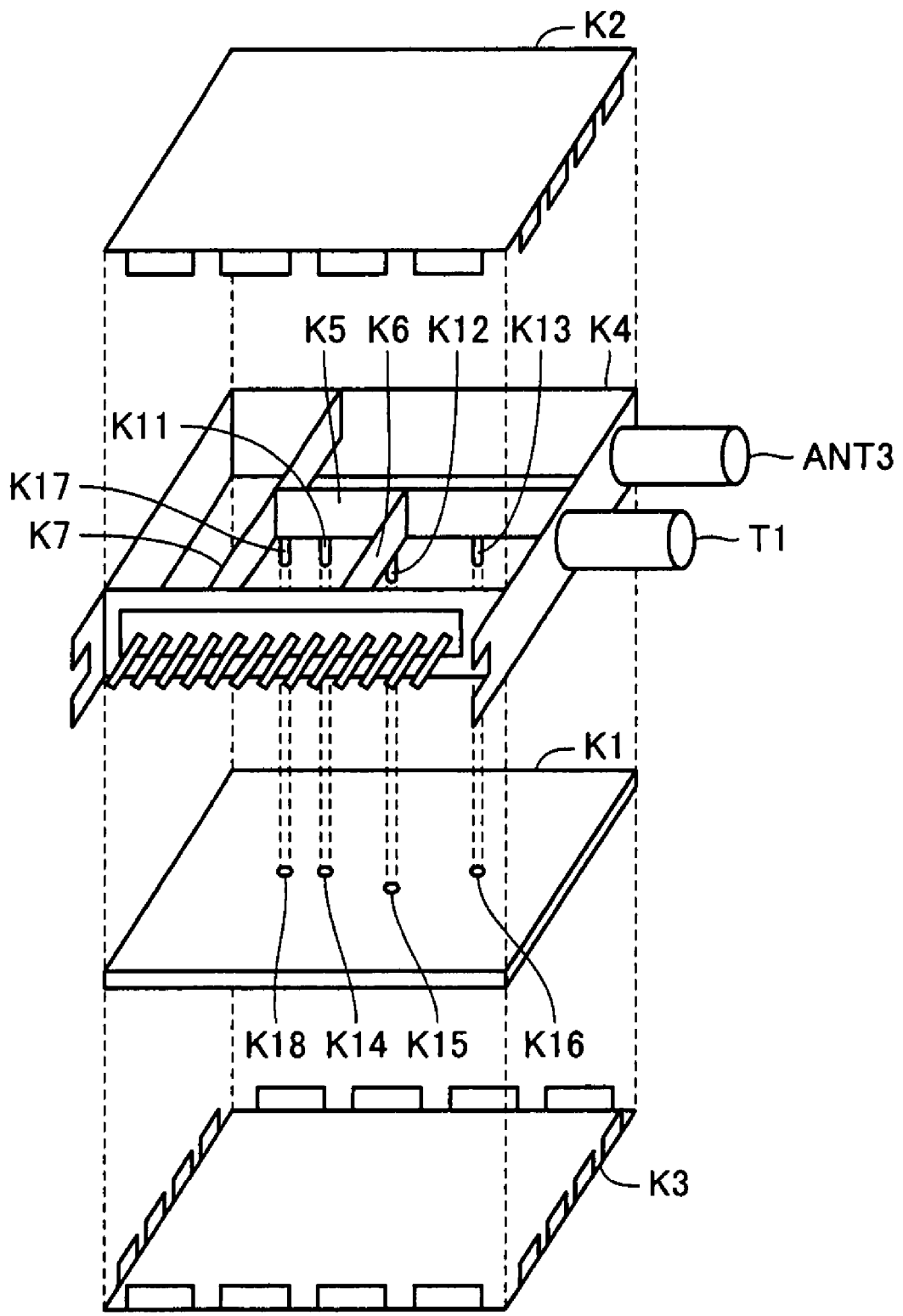
FIG. 13 is a perspective view illustrating a structure of the broadcast receiving apparatus in accordance with the fourth embodiment of the present invention.

FIG. 13 is a perspective view illustrating a structure of the broadcast receiving apparatus in accordance with the fourth embodiment of the present invention.

Referring to FIG. 13, antenna ANT3 and splitting output terminal T1 are disposed on an identical end portion of circuit board K1, that is, on an identical side of the mounting surface of circuit board K1. Since other components are identical to those described with reference to the perspective view of FIG. 2, description thereof will not be repeated.

The input terminal (ANT3) is disposed to be closest to one side of the four sides of the quadrangular mounting area of circuit board K1, and the output terminal (T1) is disposed to be closest to the one side in the same manner as the input terminal.

This arrangement facilitates design of a product such as a TV set equipped with the broadcast receiving apparatus. For example, when the broadcast receiving apparatus is disposed adjacent to an end portion of a circuit board of a product, and the product is covered with a case having an opening at a position corresponding to antenna ANT3 and splitting output terminal T1 such that only antenna ANT3 and splitting output terminal T1 are exposed to the outside of the product, lines can be connected directly from the outside of the product to antenna ANT3 and splitting output terminal T1 of the broadcast receiving apparatus, and thus design of the product can be simplified.

Fifth Embodiment

Figure 14:
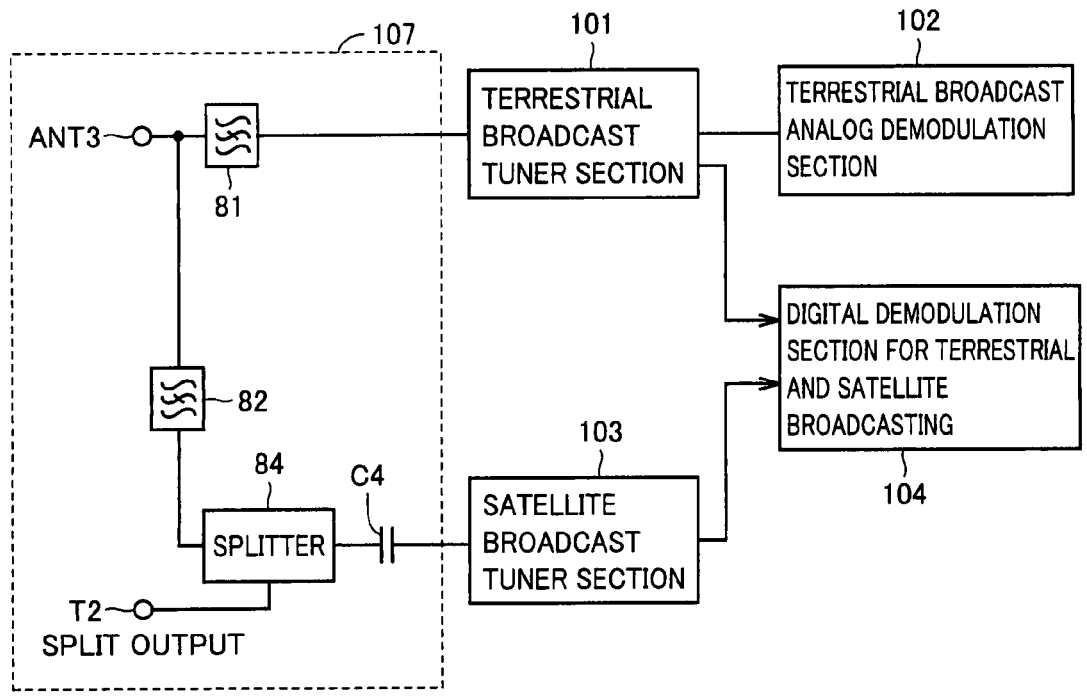
FIG. 14 is a functional block diagram illustrating a configuration of a broadcast receiving apparatus in accordance with a fifth embodiment of the present invention.

FIG. 14 is a functional block diagram illustrating a configuration of a broadcast receiving apparatus in accordance with a fifth embodiment of the present invention.

Referring to FIG. 14, the broadcast receiving apparatus includes a receiving section 107 instead of receiving section 105 in accordance with the third embodiment. Receiving section 107 includes antenna ANT3, low-pass filter 81, high-pass filter 82, capacitor C4, a splitter 84, and splitting output terminal T2.

Splitter 84 splits the attenuated satellite broadcast signal passed through high-pass filter 82, and outputs the split attenuated satellite broadcast signals to satellite broadcast tuner section 103 and to the outside of the broadcast receiving apparatus via splitting output terminal T2.

Specifically, the broadcast receiving apparatus arranged as shown in FIG. 14 includes an input terminal (ANT3) for receiving the terrestrial broadcast signal and the satellite broadcast signal, a first filter (81) provided on a path transmitting the signal from the input terminal (ANT3) to terrestrial broadcast tuner section 101 for selectively passing the terrestrial broadcast signal, a second filter (82) provided on a path transmitting the signal from the input terminal (ANT3) to satellite broadcast tuner section 103 for selectively passing the satellite broadcast signal, and an output terminal (T2) for branching and outputting the satellite broadcast signal selectively passed by the second filter (82).

With this arrangement, connection can be established for example between an input terminal of an apparatus different from the apparatus such as a TV set equipped with the broadcast receiving apparatus and an output of splitter 84 of the broadcast receiving apparatus, and the satellite broadcast signal can easily be received by a plurality of apparatuses.

Sixth Embodiment

Figure 15:
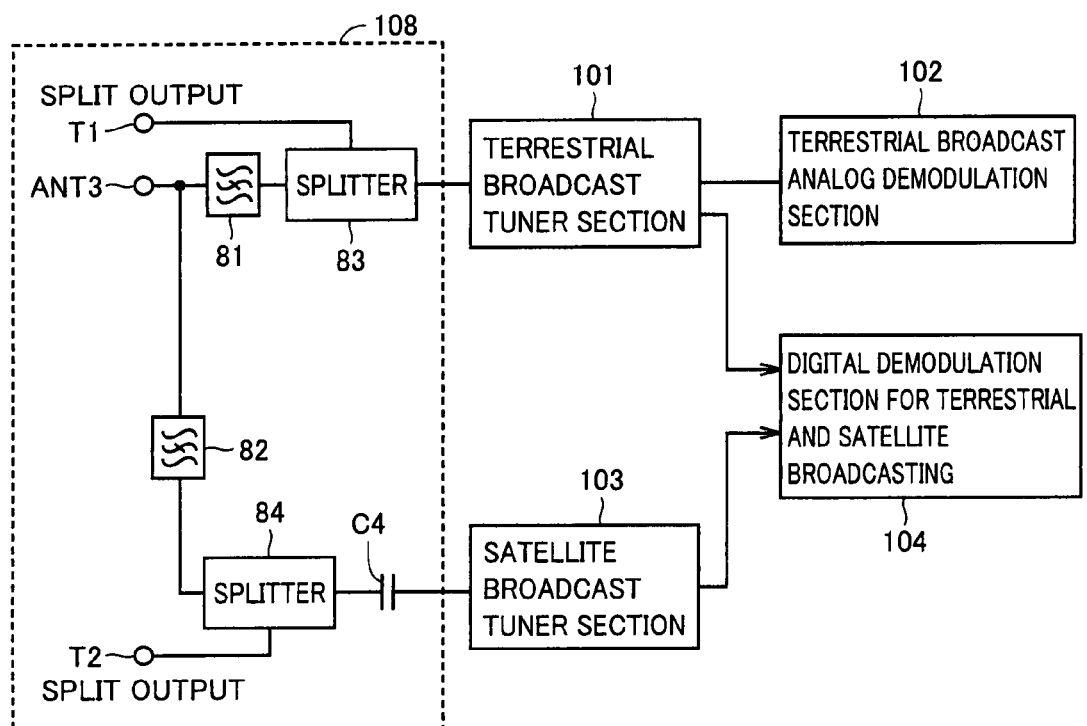
FIG. 15 is a functional block diagram illustrating a configuration of a broadcast receiving apparatus in accordance with a sixth embodiment of the present invention.

FIG. 15 is a functional block diagram illustrating a configuration of a broadcast receiving apparatus in accordance with a sixth embodiment of the present invention.

Referring to FIG. 15, the broadcast receiving apparatus includes a receiving section 108 instead of receiving section 105 in accordance with the third embodiment. Receiving section 108 includes antenna ANT3, low-pass filter 81, high-pass filter 82, capacitor C4, splitter 83, splitting output terminal T1, splitter 84, and splitting output terminal T2.

Splitter 83 splits the attenuated terrestrial broadcast signal passed through low-pass filter 81, and outputs the split attenuated terrestrial broadcast signals to terrestrial broadcast tuner section 101 and to the outside of the broadcast receiving apparatus via splitting output terminal T1.

Splitter 84 splits the attenuated satellite broadcast signal passed through high-pass filter 82, and outputs the split attenuated satellite broadcast signals to satellite broadcast tuner section 103 and to the outside of the broadcast receiving apparatus via splitting output terminal T2.

Specifically, the broadcast receiving apparatus arranged as shown in FIG. 15 includes an input terminal (ANT3) for receiving the terrestrial broadcast signal and the satellite broadcast signal, a first filter (81) provided on a path transmitting the signal from the input terminal (ANT3) to terrestrial broadcast tuner section 101 for selectively passing the terrestrial broadcast signal, a second filter (82) provided on a path transmitting the signal from the input terminal (ANT3) to satellite broadcast tuner section 103 for selectively passing the satellite broadcast signal, a first output terminal (T1) for branching and outputting the terrestrial broadcast signal selectively passed by the first filter (81), and a second output terminal (T2) for branching and outputting the satellite broadcast signal selectively passed by the second filter (82).

With this arrangement, connection can be established for example between input terminals of an apparatus different from the apparatus such as a TV set equipped with the broadcast receiving apparatus and outputs of splitters 83 and 84 of the broadcast receiving apparatus, and the terrestrial broadcast signal and the satellite broadcast signal can easily be received by a plurality of apparatuses.

Modifications

Figure 16:
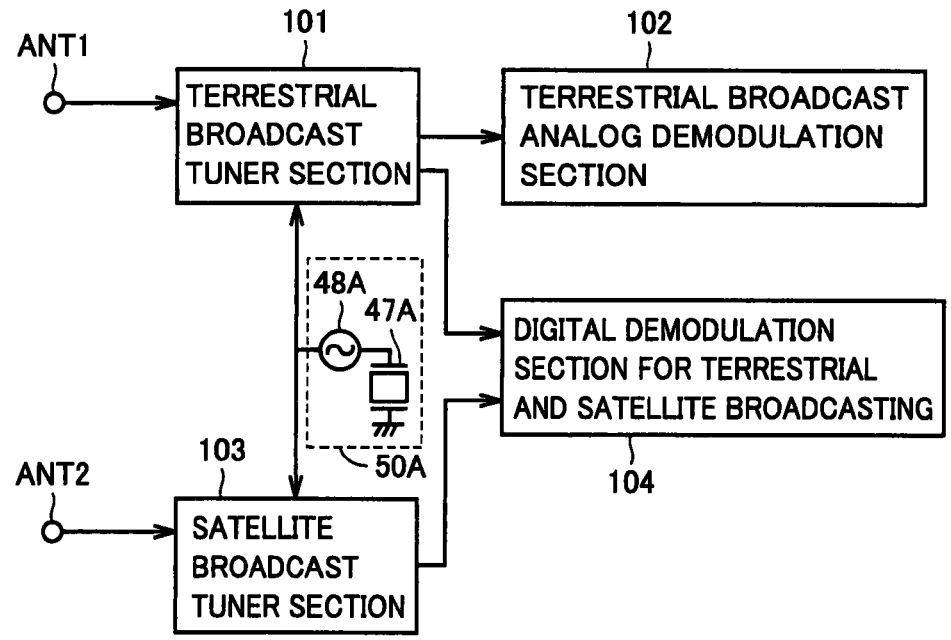
FIG. 16 is a functional block diagram illustrating a configuration of a broadcast receiving apparatus in accordance with a first modification of the present invention.

FIG. 16 is a functional block diagram illustrating a configuration of a broadcast receiving apparatus in accordance with a first modification of the present invention.

Referring to FIG. 16, the broadcast receiving apparatus in accordance with the first modification of the present invention includes a reference oscillation circuit 50A used in common for terrestrial broadcast tuner section 101 and satellite broadcast tuner section 103. Reference oscillation circuit 50A includes a crystal 47A and an oscillator 48A. Reference oscillation circuit 50A oscillates and generates a reference signal having a frequency of, for example, 4 MHz.

Specifically, terrestrial broadcast tuner section 101 and satellite broadcast tuner section 103 include local oscillation circuits 19-21 and VCO 76 controlled by PLL circuits 45 and 77, respectively. The broadcast receiving apparatus includes a reference oscillation circuit (50A) supplying a common reference signal to the PLL circuit in each of terrestrial broadcast tuner section 101 and satellite broadcast tuner section 103.

Since there is no need to provide reference oscillation circuit 50 to each of terrestrial broadcast tuner section 101 and satellite broadcast tuner section 103, it results in cost reduction.

Specifically, in the broadcast receiving apparatus in accordance with the first modification of the present invention, reference oscillation circuit 50A is used in common for terrestrial broadcast tuner section 101 and satellite broadcast tuner section 103. With this arrangement, the broadcast receiving apparatus as well as a TV set or the like equipped with the broadcast receiving apparatus can further be downsized, and manufacturing cost can further be reduced.

Figure 17:
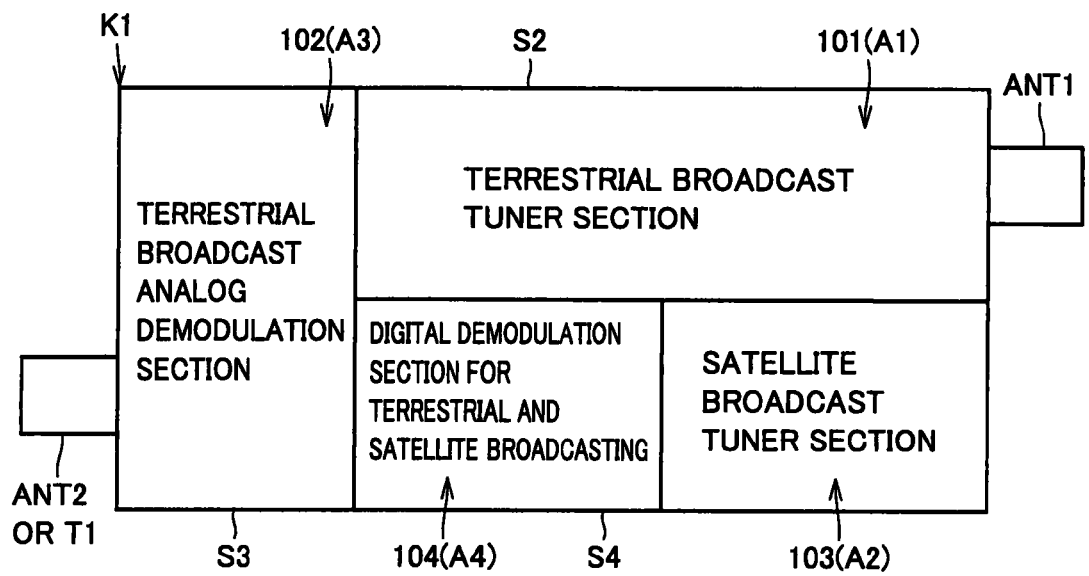
FIG. 17 is a schematic mounting diagram of a broadcast receiving apparatus in accordance with a second modification of the present invention.
Figure 18:
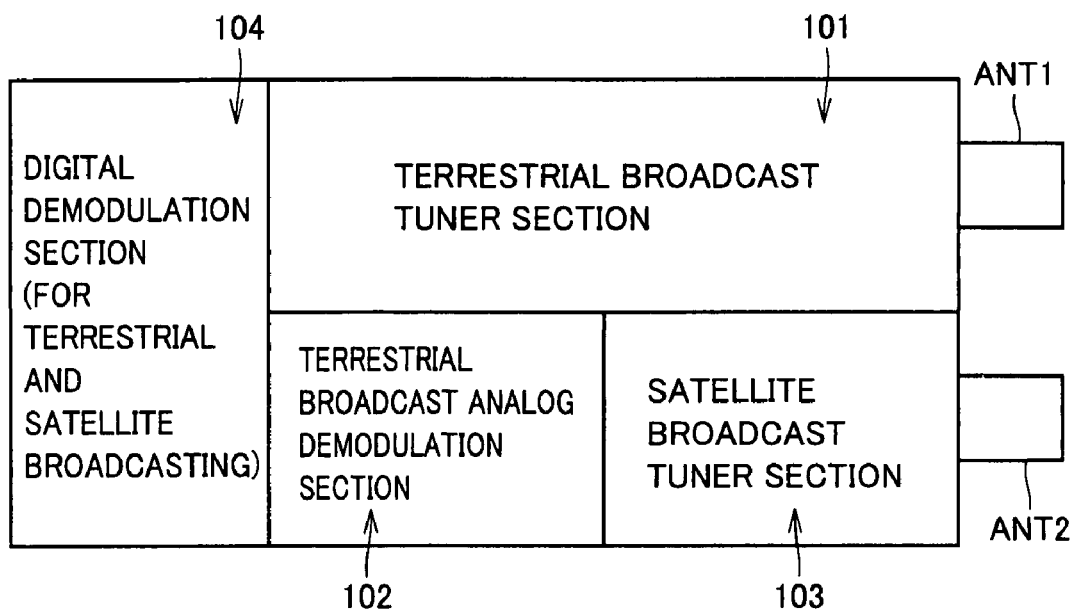
FIG. 18 is an exemplary arrangement for a tuner unit for analog and digital broadcasting.

FIG. 17 is a schematic mounting diagram of a broadcast receiving apparatus in accordance with a second modification of the present invention.

In the modification shown in FIG. 17, antenna ANT1, which is an input terminal, is disposed to be closest to side S1 of the mounting area. Further, antenna ANT2, which is an input terminal, or terminal T1, which is an output terminal, is disposed to be closest to side S3 different from side S1.

The broadcast receiving apparatus with the terminals arranged as described above may be easy to use, depending on the design of a TV set into which the broadcast receiving apparatus is equipped. The broadcast receiving apparatus as shown in FIG. 17 can suitably be used when terminals are provided on a front surface and a rear surface of a TV set.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A broadcast receiving apparatus, comprising:
a circuit board including a quadrangular mounting area having a first side, a second side connected to one end of said first side, a third side opposite to said first side, and a fourth side connected to the other end of said first side and opposite to said second side,
said mounting area including
a first area having a rectangular shape in contact with a portion of said first side and a portion of said second side,
a second area having a rectangular shape in contact with a portion of said first side and a portion of said fourth side,
a third area having a rectangular shape in contact with said third side, a portion of said second side and a portion of said fourth side, and
a fourth area in contact with said fourth side and disposed between said second area and said third area;
said broadcast receiving apparatus further comprising:
a terrestrial broadcast tuner section disposed in said first area for frequency-converting an externally supplied terrestrial broadcast signal into an IF signal;
a satellite broadcast tuner section disposed in said second area for frequency-converting an externally supplied satellite broadcast signal into a signal having a frequency band lower than that of said satellite broadcast signal; and
a digital demodulation section disposed in said fourth area for demodulating the signal supplied from either one of said terrestrial broadcast tuner section and said satellite broadcast tuner section, wherein
in said third area, a terrestrial broadcast analog demodulation section, for demodulating the IF signal frequency-converted by said terrestrial broadcast tuner section, is removable,
said third area is provided such that a new side is opposed to said first side of said quadrangular mounting area if said third area is removed, and
said new side includes an edge portion of said first area opposed to said third side and an edge portion of said fourth area opposed to said third side.

2. The broadcast receiving apparatus according to claim 1, further comprising a shield case accommodating said circuit board,
wherein a ground pattern of said circuit board is electrically connected with said shield case.

3. The broadcast receiving apparatus according to claim 1, further comprising: a shield case accommodating said circuit board; and
a shield wall separating each of said first to fourth areas from others in a space inside said shield case,
wherein a ground pattern of said circuit board is electrically connected with said shield case.

4. The broadcast receiving apparatus according to claim 1, wherein
each of said terrestrial broadcast tuner section and said satellite broadcast tuner section includes a local oscillation circuit controlled by a phase-locked loop circuit, and
said broadcast receiving apparatus further comprises a reference oscillation circuit supplying a common reference signal to the phase-locked loop circuit in each of said terrestrial broadcast tuner section and said satellite broadcast tuner section.

5. The broadcast receiving apparatus according to claim 1, further comprising:
a terrestrial broadcast input terminal disposed on said circuit board to extend from said first side toward an outside of said mounting area, for receiving said externally supplied terrestrial broadcast signal; and
a satellite broadcast input terminal disposed on said circuit board to extend from said first side toward the outside of said mounting area and disposed side by side with said terrestrial broadcast input terminal, for receiving said externally supplied satellite broadcast signal.

6. The broadcast receiving apparatus according to claim 5, wherein
said terrestrial broadcast tuner section includes a first filter for receiving the signal transmitted from said terrestrial broadcast input terminal, and
said broadcast receiving apparatus further comprises an output terminal for splitting the signal output from said first filter and outputting the split signal to an outside of said broadcast receiving apparatus.

7. The broadcast receiving apparatus according to claim 5, wherein
said satellite broadcast tuner section includes a first filter for receiving the signal transmitted from said satellite broadcast input terminal, and
said broadcast receiving apparatus further comprises an output terminal for splitting the signal output from said first filter and outputting the split signal to an outside of said broadcast receiving apparatus.

8. The broadcast receiving apparatus according to claim 5, wherein
said terrestrial broadcast tuner section includes a first filter for receiving the signal transmitted from said terrestrial broadcast input terminal,
said satellite broadcast tuner section includes a second filter for receiving the signal transmitted from said satellite broadcast input terminal, and
said broadcast receiving apparatus further comprises
a first output terminal for splitting the signal output from said first filter and outputting the split signal to an outside of said broadcast receiving apparatus; and
a second output terminal for splitting the signal output from said second filter and outputting the split signal to the outside of said broadcast receiving apparatus.

9. The broadcast receiving apparatus according to claim 1, further comprising:
an input terminal for receiving said terrestrial broadcast signal and said satellite broadcast signal;
a first filter provided on a path transmitting the signal from said input terminal to said terrestrial broadcast tuner section for selectively passing said terrestrial broadcast signal; and
a second filter provided on a path transmitting the signal from said input terminal to said satellite broadcast tuner section for selectively passing said satellite broadcast signal.

10. The broadcast receiving apparatus according to claim 9, further comprising an output terminal for branching and outputting said terrestrial broadcast signal selectively passed by said first filter.

11. The broadcast receiving apparatus according to claim 10, wherein
said input terminal is disposed to be closest to one side of said first to fourth sides of said mounting area, and
said output terminal is disposed to be closest to said one side in the same manner as said input terminal.

12. The broadcast receiving apparatus according to claim 10, wherein
said input terminal is disposed to be closest to one side of said first to fourth sides of said mounting area, and
said output terminal is disposed to be closest to a side different from said one side.

13. The broadcast receiving apparatus according to claim 9, further comprising an output terminal for branching and outputting said satellite broadcast signal selectively passed by said second filter.

14. The broadcast receiving apparatus according to claim 13, wherein
said input terminal is disposed to be closest to one side of said first to fourth sides of said mounting area, and
said output terminal is disposed to be closest to said one side in the same manner as said input terminal.

15. The broadcast receiving apparatus according to claim 13, wherein
said input terminal is disposed to be closest to one side of said first to fourth sides of said mounting area, and
said output terminal is disposed to be closest to a side different from said one side.

16. The broadcast receiving apparatus according to claim 9, further comprising:
a first output terminal for branching and outputting said terrestrial broadcast signal selectively passed by said first filter; and
a second output terminal for branching and outputting said satellite broadcast signal selectively passed by said second filter.

17. The broadcast receiving apparatus according to claim 16, wherein
said input terminal is disposed to be closest to one side of said first to fourth sides of said mounting area, and
at least one of said first and second output terminals is disposed to be closest to said one side in the same manner as said input terminal.

18. The broadcast receiving apparatus according to claim 16, wherein
said input terminal is disposed to be closest to one side of said first to fourth sides of said mounting area, and
at least one of said first and second output terminals is disposed to be closest to a side different from said one side.

19. The broadcast receiving apparatus according to claim 1, wherein said broadcast receiving apparatus is capable of receiving analog terrestrial broadcasting, digital terrestrial broadcasting, and digital satellite broadcasting.

* * * * *